US008156363B2

(12) United States Patent
Kobayashi et al.

(10) Patent No.: US 8,156,363 B2
(45) Date of Patent: Apr. 10, 2012

(54) INFORMATION PROCESSING DEVICE AND MOBILE PHONE INCLUDING COMPARISON OF POWER CONSUMPTION INFORMATION AND REMAINING POWER

(75) Inventors: Keita Kobayashi, Osaka (JP); Ryoko Morita, Osaka (JP); Yusuke Ito, Hyogo (JP); Naoya Ichinose, Osaka (JP); Shoichi Araki, Kyoto (JP); Osamu Nishimura, Kyoto (JP); Toshio Sasaoka, Nara (JP); Yoko Matsushima, Osaka (JP)

(73) Assignee: Panasonic Corporation, Osaka (JP)

( * ) Notice: Subject to any disclaimer, the term of this patent is extended or adjusted under 35 U.S.C. 154(b) by 928 days.

(21) Appl. No.: 12/164,853

(22) Filed: Jun. 30, 2008

(65) Prior Publication Data

US 2009/0013204 A1    Jan. 8, 2009

(30) Foreign Application Priority Data

Jul. 2, 2007   (JP) ................................. 2007-174638
May 26, 2008  (JP) ................................. 2008-136409

(51) Int. Cl.
   *G06F 1/32*        (2006.01)
(52) U.S. Cl. ......................... 713/340; 713/300; 713/320
(58) Field of Classification Search .................. None
   See application file for complete search history.

(56) References Cited

U.S. PATENT DOCUMENTS

| 5,809,316 | A * | 9/1998 | Gouzu ........................... 713/323 |
| 6,433,512 | B1 | 8/2002 | Birkler et al. |
| 6,630,814 | B2 | 10/2003 | Ptasinski et al. |
| 7,111,179 | B1 | 9/2006 | Girson et al. |
| 2004/0193929 | A1 | 9/2004 | Kuranuki |
| 2005/0138470 | A1 | 6/2005 | Cromer et al. |
| 2006/0265181 | A1 | 11/2006 | Stewart |
| 2007/0226399 | A1 | 9/2007 | So et al. |
| 2008/0005607 | A1 | 1/2008 | Fukatsu |
| 2008/0170686 | A1 | 7/2008 | Nemoto et al. |

FOREIGN PATENT DOCUMENTS

| CN | 1774104 | 5/2006 |
| JP | 7-168726 | 7/1995 |
| JP | 2004-078721 | 3/2004 |
| JP | 2005-293519 | 10/2005 |
| JP | 2006-119916 | 5/2006 |
| JP | 2006-129302 | 5/2006 |
| JP | 2006-319585 | 11/2006 |
| JP | 2006-350481 | 12/2006 |
| JP | 2007-158831 | 6/2007 |

OTHER PUBLICATIONS

English language Abstract of JP 2006-129302, May 18, 2006.
English language Abstract of JP 7-168726, Jul. 4, 1995.
China Office action, mail date is Jun. 15, 2011.

* cited by examiner

*Primary Examiner* — Dennis M Butler
(74) *Attorney, Agent, or Firm* — Greenblum & Bernstein, P.L.C.

(57) ABSTRACT

An information processing device and a mobile terminal include a power consumption calculator which calculates, for each processing executed by the information processing device (or mobile terminal), power consumption information concerning an amount of power consumed by executing each processing. A request generator compares the amount of power indicated by the power consumption information and a remaining amount of power of the information processing device(or mobile terminal), and generates a request to execute predetermined processing according to a result of the comparison. A request processor executes the predetermined processing in response to the generated request.

24 Claims, 27 Drawing Sheets

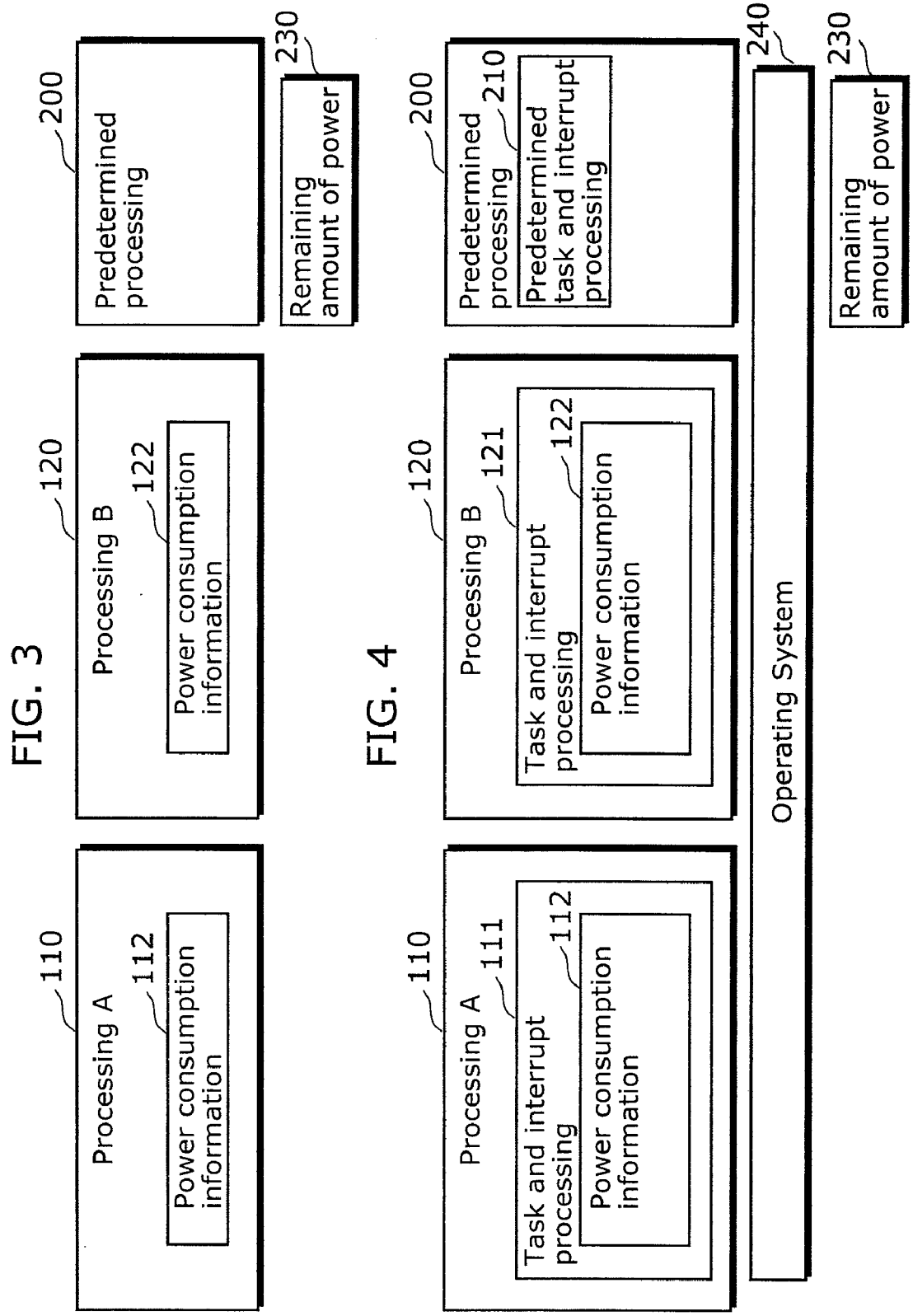

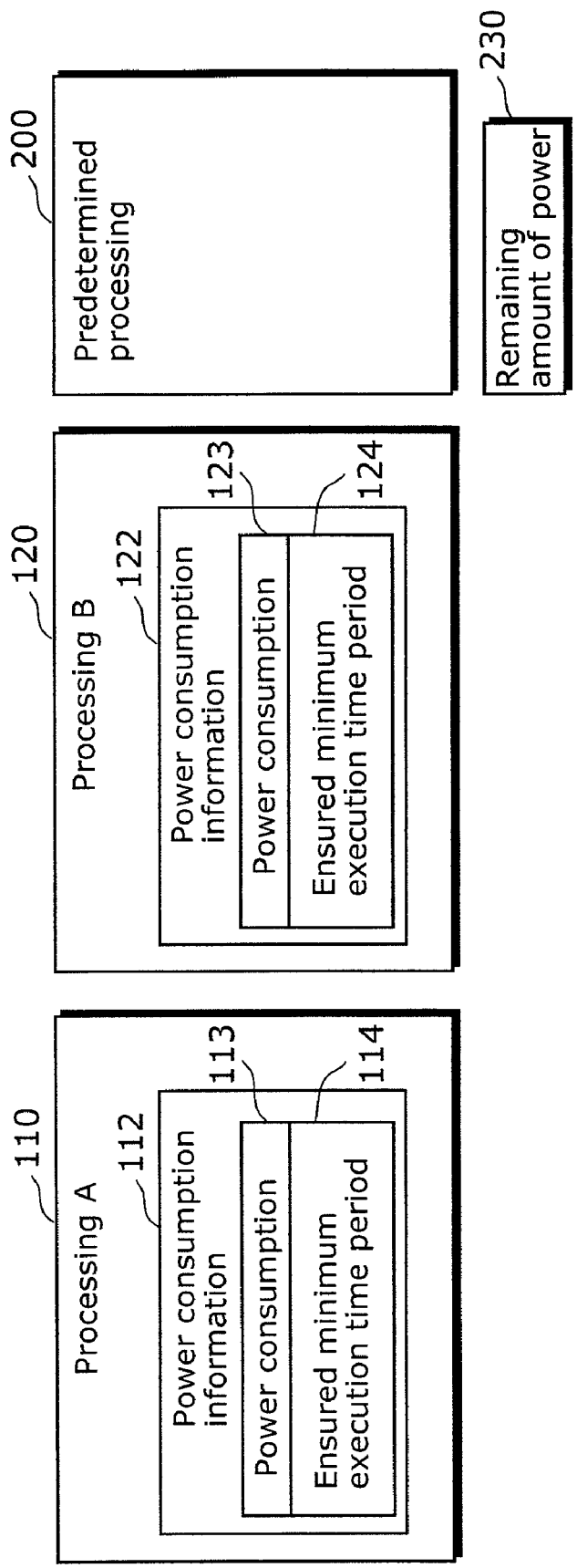

FIG. 17

| Function | Power consumption | Ensured minimum execution time period | Ensured amount of power |
|---|---|---|---|
| Call | 0.05 | 200 | 10 |
| Mail | 0.02 | 250 | 5 |
| Camera | 0.20 | 0 | 0 |
| Game | 0.375 | 0 | 0 |
| Internet etc. | 0.05 | 0 | 0 |
| Videophone | | | |
| Bluetooth | | | |
| Music | | | |
| TV recording | | | |
| Debit/Credit card function | | | |
| Safety key | | | |
| | | | |

FIG. 18

| Time | Processing | Remaining amount of power | Calculate power consumption | | | | Total ensured amount of power = Σ (Power consumption × To-be-Ensured minimum execution time period) |
|---|---|---|---|---|---|---|---|
| | | | Call | | Mail | | |
| | | | Power consumption | Ensured minimum execution time period | Power consumption | Ensured minimum execution time period | |
| T0=0 | Start mail | 100 | 0.05 | 200 | 0.02 | 250 | 15 |
| T1=100 | Terminate mail Start call | 98 | 0.05 | 200 | 0.02 | 250 | 15 |
| T2=500 | Terminate call Start mail | 78 | 0.05 | 200 | 0.02 | 250 | 15 |
| T3=900 | Terminate mail Activate camera | 68 | 0.05 | 200 | 0.025 | 250 | 16.25 |
| T4=1000 | Terminate camera Start call | 50 | 0.05 | 200 | 0.025 | 250 | 16.25 |
| T5=1200 | Terminate call Start game | 30 | 0.1 | 200 | 0.025 | 250 | 26.25 |
| T6=1210 | Activate predetermined processing | 26.25 | | | | | 26.25 |

FIG. 21

| Time | Processing | Remaining amount of power | Amount of power consumption | Power consumption of each processing = Amount of power consumption for execution /Execution time period |
|---|---|---|---|---|
| T0=0 | Start mail | 100 | | |
| T1=100 | Terminate mail<br>Start call | 98 | 2 | 0.02 = 0.02 |
| T2=500 | Terminate call<br>Start mail | 78 | 20 | 0.05 = 0.05 |
| T3=900 | Terminate mail<br>Activate camera | 68 | 10 | 0.02 ⇒ 0.025<br>(Update) |
| T4=1000 | Terminate camera<br>Start call | 50 | 18 | 0.018 < 0.2 |
| T5=1200 | Terminate call | 30 | 20 | 0.05 ⇒ 0.1<br>(Update) |

INFORMATION PROCESSING DEVICE AND MOBILE PHONE INCLUDING COMPARISON OF POWER CONSUMPTION INFORMATION AND REMAINING POWER

BACKGROUND OF THE INVENTION (1) Field of the Invention

The present invention relates to an information processing device, and more particularly to an information processing device which calculates power consumption necessary for executing task processing and the like of an operating system (OS), and executes the task processing and the like of the OS based on the calculated power consumption.

(2) Description of the Related Art

Conventionally known as devices equipped with a function to calculate power consumption are mobile terminals which manage power supply schedule by: obtaining, from broadcast waves and the like, power consumption information for recording a broadcast; and comparing the remaining amount of power in the battery with an amount of power consumption necessary for recording the broadcast (Refer to Patent Reference 1: Japanese Unexamined Patent Application Publication No. 2006-129302).

Other devices known to be equipped with the function to calculate power consumption are electric computers which judge whether or not the amount of power consumption per unit of time exceeds a predetermined amount of power consumption, and perform process scheduling according to the judgment result (Refer to Patent Reference 2: Japanese Unexamined Patent Application Publication No. 7-168726).

However, the technique disclosed in Patent Reference 1 entails a problem that the mobile terminals having no communication function cannot obtain the power consumption information, because in order for mobile terminals having a broadcast receiving unit to obtain the power consumption information on every function, the power consumption information on every function needs to be transmitted to the mobile terminals from a base station or the like. Further, there is also a problem that such mobile terminals cannot receive the power consumption information that changes depending on the usage by the user.

Furthermore, the technique disclosed in Patent Reference 2 entails a problem that it is impossible to ensure execution of a specific function for a specified period of time. For example, it is impossible to leave an amount of power in the battery to make a 5-minute call, and execute other processing, such as browsing the Internet, using power within the remaining amount of power.

SUMMARY OF THE INVENTION

The present invention has been conceived in view to solve the above described problems, and has an object to provide an information processing device, for use in a mobile terminal unable to obtain power consumption information from an external source, which can: estimate a battery life, power consumption of each function that changes depending on the usage by the user, and so on based on an actual performance value; and enable execution of a function specified by the user for a specified period of time using power within the remaining amount of power.

To achieve the object set forth above, the information processing device according to the present invention is configured to measure power consumption of a specific function of the information processing device, and execute predetermined processing when a remaining amount of power of the information processing device becomes equal to or smaller than an amount of power consumption necessary for executing the specific function for a specific period of time with the measured power consumption.

With this configuration, it is possible, for a mobile terminal unable to obtain power consumption information from an external source, to estimate a battery life, each function's power consumption that changes depending on the usage by the user, and so on, based on an actual performance value. Therefore, it is possible to execute the specific function for the specific period of time using power within the remaining amount of power.

Preferably, the information processing device comprises: a power consumption calculating unit configured to calculate, for each processing such as a task of an operating system (OS) executed by the information processing device, power consumption information concerning an amount of power consumed by executing each processing; a request generating unit configured to compare the amount of power indicated by the power consumption information and a remaining amount of power of the information processing device, and to generate a request to execute predetermined processing according to a result of the comparison; and a request processing unit configured to execute the predetermined processing in response to the request generated by the request generating unit operating system (OS).

It is to be noted that the predetermined processing executed according to the result of the comparison includes: displaying a time period for which the function specified by the user can be used; switching the mobile terminal to a power saving mode; and transmitting a notification to another receiving terminal, such as a parent's mobile terminal.

With this method, the information processing device can calculate power consumption information of each processing, and activate the predetermined processing according to the currently remaining amount of power. Therefore, the information processing device can calculate amounts of power consumption of various processing equipped in the information processing device, without receiving power consumption information from an external source. Consequently, the user can use other functions while leaving an amount of power consumption of a necessary function. Thus, preferably, the power consumption information includes: an ensured minimum execution time period which is a minimum period of time for which a user wishes to execute the processing; and power consumption which is an amount of power consumed when the processing is executed for a unit of time.

The information processing device can calculate power consumption of each processing, and activate the predetermined processing according to: an amount of power necessary for executing the predetermined processing for a time period set for each processing; and the currently remaining amount of power. Therefore, the user can use other functions of the information processing device while leaving the amount of power consumption necessary for executing the various functions of the information processing device for a specified period of time.

More preferably, the power consumption information further includes a processing operation mode in which processing is executed, and the power consumption calculating unit is configured to calculate power consumption based on the power consumption managed through historical management and on the processing operation mode.

The information processing device can calculate power consumption of each processing for every operation mode, select processing according to the operation mode, and activate predetermined processing according to the currently remaining amount of power and the amount of power necessary for executing the predetermined processing for a time period set for each processing. Therefore, the user can use other functions of the information processing device while leaving the amount of power consumption necessary for executing the various functions of the information processing device for a time period specified for each operation mode.

More preferably, the power consumption calculating unit is configured to calculate power consumption based on: an amount of power consumption for execution which is an amount of power consumed when the processing is executed for an execution time period; the execution time period which is a period of time for which processing is executed; and an external factor coefficient which is a value determined based on an external factor affecting the power consumption.

Calculation of the power consumption using the external factor coefficient allows the operation mode to reflect on the power consumption, and thus the power consumption calculating unit can calculate the power consumption information more accurately.

It is to be noted that the present invention can be embodied not only as the information processing device including the above described characteristic processing units, but also as: an information processing method having, as steps, the characteristic processing units included in the information processing device; and a program causing a computer to execute such characteristic steps included in the information processing method. Obviously, such a program can be distributed via recording media such as a Compact Disc-Read Only Memory (CD-ROM) and via a communication network such as the Internet.

As described above, according to the information processing device of the present invention, even with a device unable to obtain information from an external source using a broadcast receiving unit and the like, it is possible to: calculate power consumption information for each processing according to the individual usage style; and use the Internet and the like using power within the remaining amount of power in the battery, while ensuring execution, by the mobile phone and the like, of necessary function for a necessary period of time.

FURTHER INFORMATION ABOUT TECHNICAL BACKGROUND TO THIS APPLICATION

The disclosures of Japanese Patent Application No. 2007-174638 filed on Jul. 2, 2007 and Japanese Patent Application No. 2008-136409 filed on May 26, 2008 including specifications, drawings and claims are incorporated herein by reference in their entirety.

BRIEF DESCRIPTION OF THE DRAWINGS

These and other objects, advantages and features of the invention will become apparent from the following description thereof taken in conjunction with the accompanying drawings that illustrate a specific embodiment of the invention. In the Drawings:

FIG. 3 is a diagram showing the configuration of processing executed by the mobile terminal according to the first embodiment of the present invention.

FIG. 4 is a diagram showing the configuration of processing executed by the mobile terminal according to the first embodiment of the present invention.

FIG. 5 is a diagram showing the configuration of processing executed by the mobile terminal according to the first embodiment of the present invention.

FIG. 17 is a table showing an example of setting of power consumption information according to the first embodiment of the present invention.

FIG. 18 is a table showing an example of calculation of the power consumption information according to the first embodiment of the present invention.

FIG. 21 is a table showing an example of an update of power consumption according to the first embodiment of the present invention.

DESCRIPTION OF THE PREFERRED EMBODIMENT(S)

The following shall describe embodiments of the present invention with reference to the accompanied drawings.

First Embodiment

The following shall describe a first embodiment of the present invention. A mobile terminal according to the present embodiment is characterized by calculating power consumption of each processing, and activating predetermined processing according to the currently remaining amount of power.

First Embodiment

Configuration

The mobile terminal according to the first embodiment is a mobile device which is battery-operated and is portable. More specifically, examples of the mobile terminal include mobile phones, Personal Handy-phone Systems (PHS), Personal Digital Assistants (PDA), mobile game machines, and laptop computers. It is to be noted that this is the same for the mobile terminals according to the following embodiments.

Figure 1:
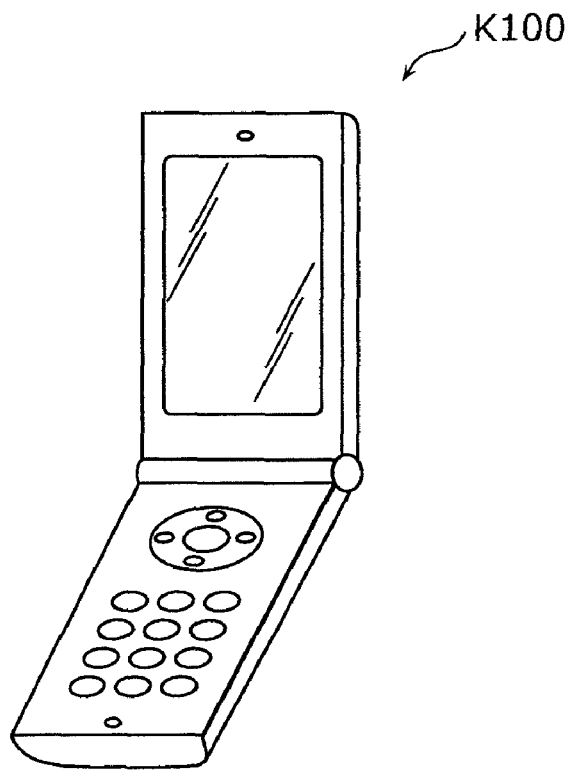
FIG. 1 is a diagram showing an example of an external view of a mobile terminal according to embodiments of the present invention.

FIG. 1 is a diagram showing an example of an external view of the mobile terminal according to the embodiments of the present invention. Here, a mobile phone is shown as an example of a mobile terminal K100.

Figure 2:
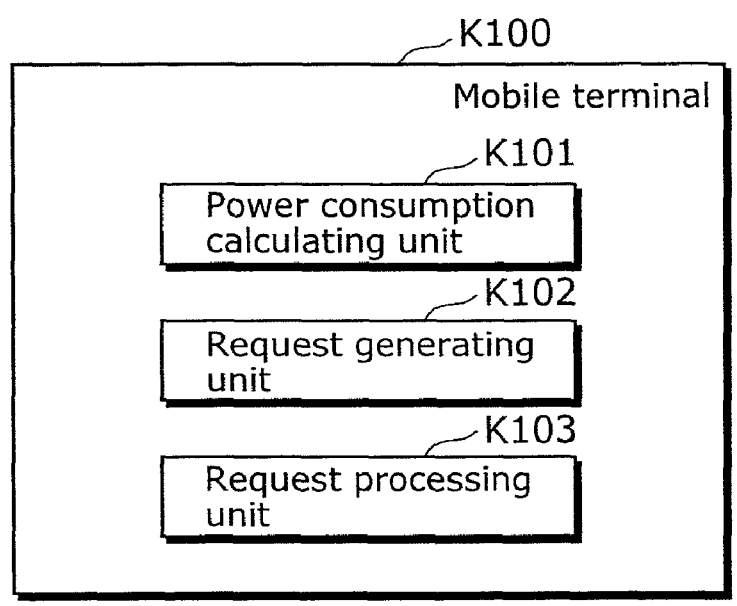
FIG. 2 is a diagram showing a functional configuration of a mobile terminal according to a first embodiment of the present invention.

FIG. 2 is a diagram showing a functional configuration of the mobile terminal according to the present embodiment.

The mobile terminal K100 includes a power consumption calculating unit K101, a request generating unit K102, and a request processing unit K103.

The mobile terminal K100 is configured with hardware, software, or a combination of these two. For example, in the case of using a computer, examples of the power consumption calculating unit K101, the request generating unit K102, and the request processing unit K103 include: hardware configured with a Central Processing Unit (CPU), a memory, a bus, an interface, a peripheral device, and the like; and software which can be executed with such hardware. To be more specific, by sequentially executing programs expanded in the memory, each function of the mobile terminal K100 (for example, the power consumption calculating unit K101, the request generating unit K102, and the request processing unit K103 described above) is achieved through processing, accumulating, outputting and so on of data in the memory and of data inputted through the interface. It is to be noted that the mobile terminals in the following embodiments are also configured with hardware, software, or a combination of these two.

FIGS. 3 and 4 are diagrams showing the configuration of processing executed by the mobile terminal according to the first embodiment. More specifically, the mobile terminal K100 executes the processing shown in FIG. 3 or FIG. 4 in addition to the processing for achieving each of the functions shown in FIG. 2.

The processing executed by the mobile terminal is considered as specific function of the mobile terminal, and examples thereof include a call function, a mail function, an Internet function, a game function, a videophone function, a TV viewing function, a TV recording function, a camera function, a video function, a music function, and other various applications of the mobile terminal.

As shown in FIG. 3, it is assumed that the mobile terminal K100 executes processing A 110, processing B 120 and predetermined processing 200. Here, as shown in FIG. 4, it may be that the processing A 110, the processing B 120 and the predetermined processing 200 are managed by an operating system (OS) 240, and that each processing is configured with one or more tasks and interrupt processing. The processing A 110 and the processing B 120 manage power consumption information 112 and power consumption information 122, respectively.

Further, as shown in FIG. 5, the power consumption information 112 of the processing A 110 includes power consumption 113 and an ensured minimum execution time period 114, and is managed by the processing A 110. Likewise, the power consumption information 122 of the processing B 120 includes power consumption 123 and an ensured minimum execution time period 124, and is managed by the processing B 120.

Figure 6:
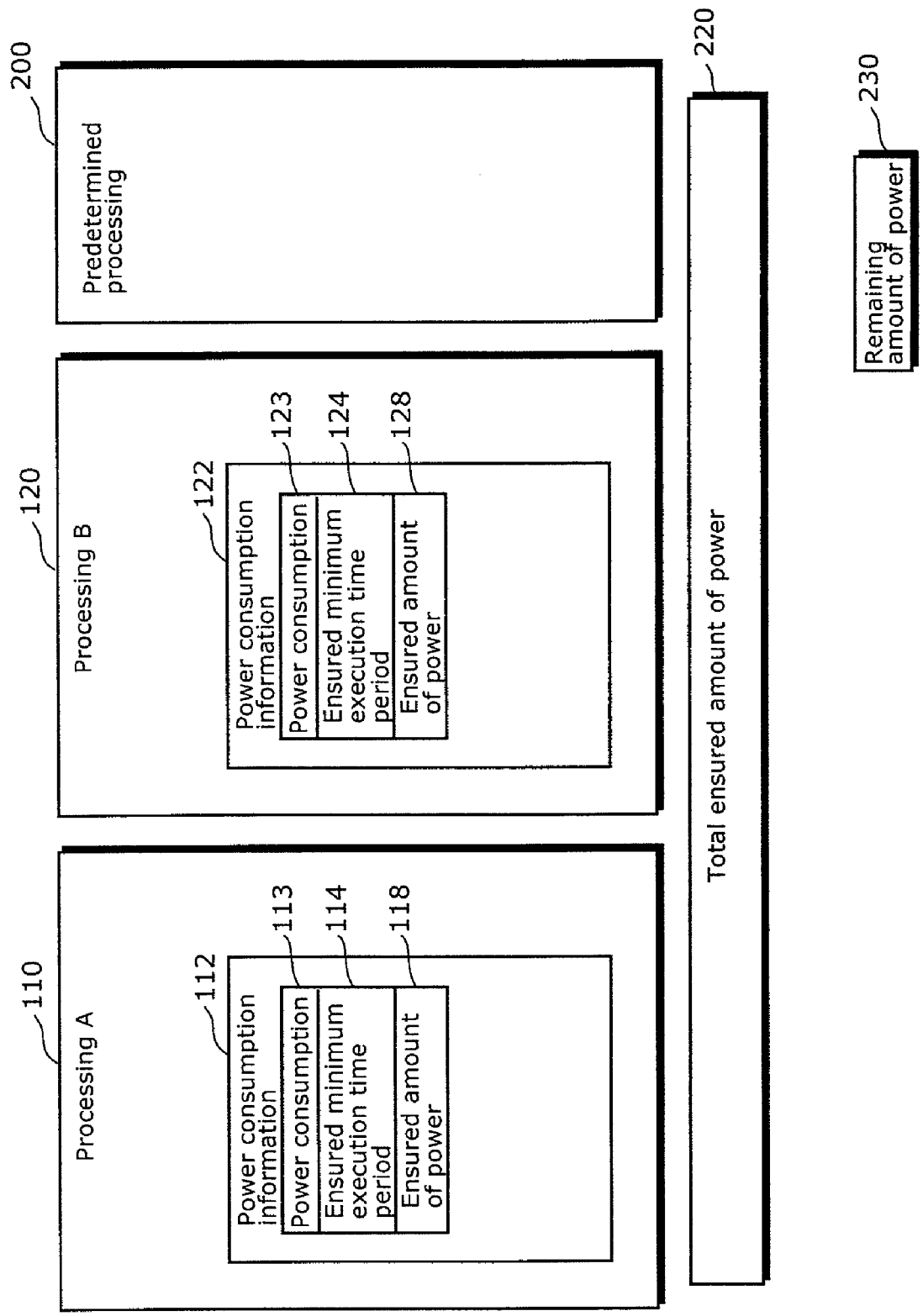
FIG. 6 is a diagram showing the configuration of processing executed by the mobile terminal according to the first embodiment of the present invention.

Further, as shown in FIG. 6, the power consumption information 112 of the processing A 110 in some cases includes an ensured amount of power 118. As shown in FIG. 6, the ensured amount of power 118 is managed by the processing A 110. Likewise, the power consumption information 122 of the processing B 120 includes an ensured amount of power 128 which is managed by the processing B 120.

Figure 7:
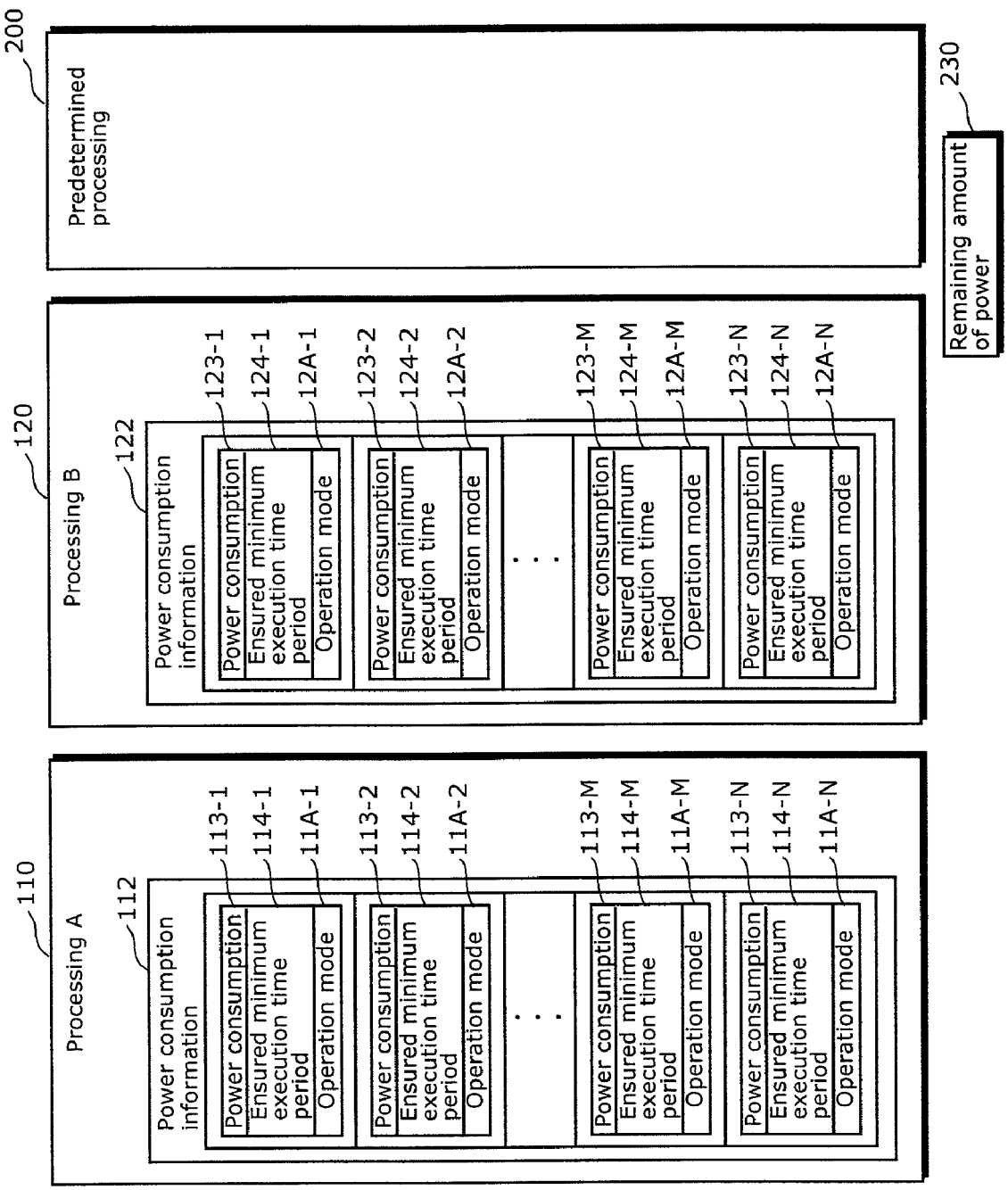
FIG. 7 is a diagram showing the configuration of processing executed by the mobile terminal according to the first embodiment of the present invention.

Furthermore, as shown in FIG. 7, the power consumption information 112 of the processing A 110 may be a history of a combination of power consumption, an ensured minimum execution time period, and an operation mode. This is the same for the power consumption information 122 of the processing B 120. Such information histories may be managed through arrangement of the information and based on the number of times the power consumption information is calculated. In such a case, the power consumption information 112 of the processing A 110 is managed through arrangement of a part, including an operation mode, or all of the information. Likewise, the power consumption information 122 of the processing B 120 is managed through arrangement of a part, including an operation mode, or all of the information. Further, in some cases, such information histories are managed based on the number of times the power consumption information is calculated.

Figure 8:
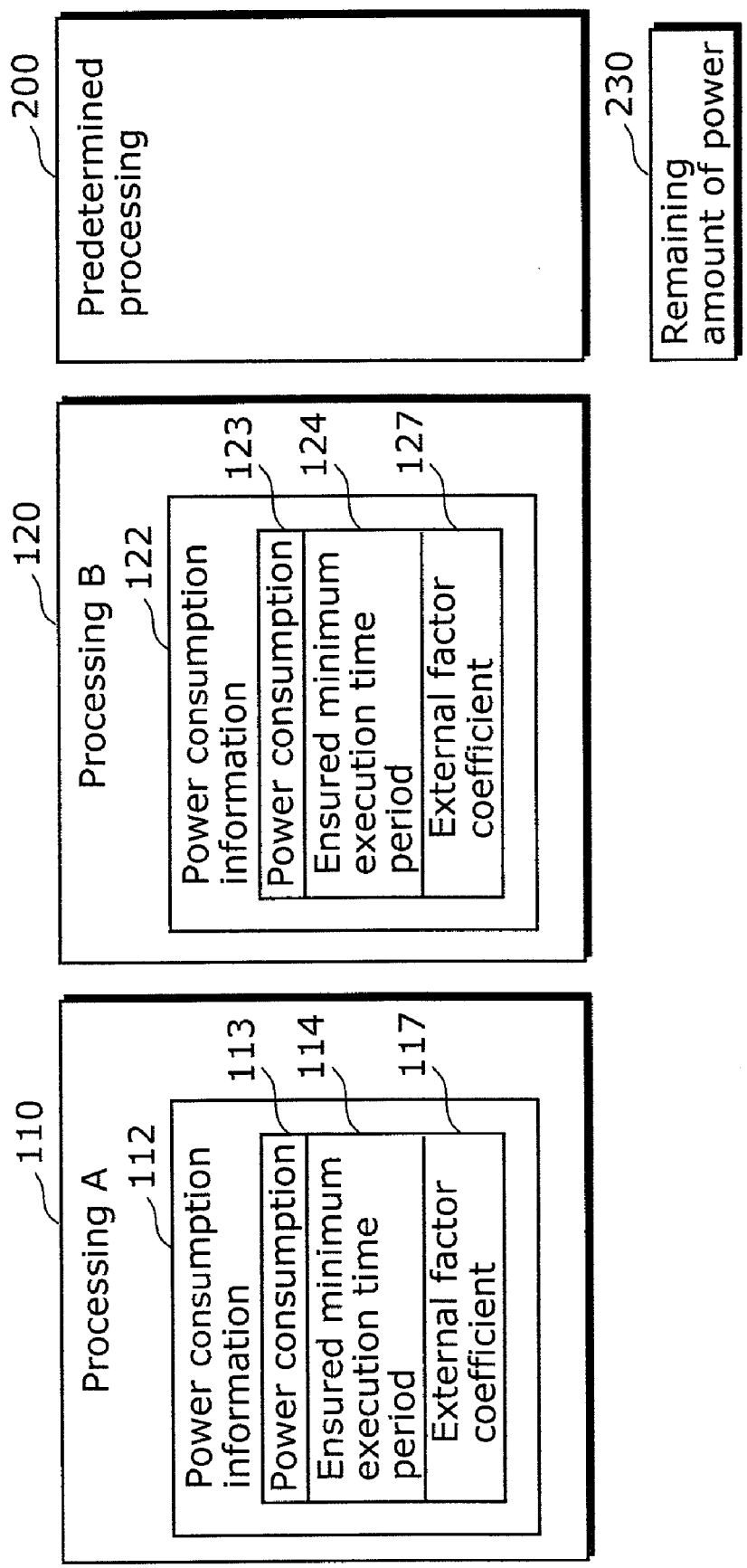
FIG. 8 is a diagram showing the configuration of processing executed by the mobile terminal according to the first embodiment of the present invention.

Furthermore, as shown in FIG. 8, the power consumption information 112 of the processing A 110 may include the power consumption 113, the ensured minimum execution time period 114, and an external factor coefficient 117 of the processing A 110. This is the same for the power consumption information 122 of the processing B 120.

Moreover, the mobile terminal K100 also manages a remaining amount of power 230.

The power consumption information 112 indicates information on power consumed by the processing A 110. More specifically, the power consumption information 112 contains numeric values such as 0.25 Wh and so on. Likewise, the power consumption information 122 indicates information on power consumed by the processing B 120.

The power consumption 113 is information indicating an amount of power consumed when the processing A 110 is executed for a unit of time.

The ensured minimum execution time period 114 is a minimum period of time for which the user wishes to execute the processing A 110. For example, when an amount of power in the battery is to be left to enable the use of the mobile phone's call function for 200 seconds, the ensured minimum execution time period 114 can be set to "200". The unit of time may be a time unique to the mobile terminal, in addition to seconds, minutes, hours, days, months and years. This is the same for the power consumption 123 and the ensured minimum execution time period 124.

Furthermore, the ensured minimum execution time period 114 can be set in advance to any given period of time on a terminal-by-terminal basis, and it can be set by the user or a third party different from the user. This is the same for the ensured minimum execution time period 124. The value of the ensured minimum execution time period can be automatically set at a specific timing.

The ensured amount of power 118 indicates an amount of power necessary for ensuring the execution of the processing A 110 for the ensured minimum execution time period 114. More than one processing can be specified as processing to be ensured for the ensured minimum execution time period 114. This aspect of the ensured minimum execution time period 114 also applies to the ensured minimum execution time period 124. It is to be noted that the sum of the ensured amounts of power of all processing is managed as a total ensured amount of power 220.

Further, as shown in FIG. 7, when the power consumption information 112 (122) is managed through historical management, the first element in the arrangement of the power consumption information 112 of the processing A 110 is represented as power consumption 113-1, an ensured minimum execution time period 114-1, and an operation mode 11A-1, and the Nth element in the arrangement is represented as power consumption 113-N, an ensured minimum execution time period 114-N, and an operation mode 11A-N. Moreover, the Mth element in the arrangement is represented as power consumption 113-M, an ensured minimum execution time period 114-M, and an operation mode 11A-M.

Furthermore, the external factor coefficient 117 is a value determined based on an external factor affecting the power consumption, and is determined by the operation mode. It is to be noted that the operation mode may include an external temperature, or a hardware-related coefficient such as a CPU operation mode or a cache hit rate.

The remaining amount of power 230 includes the current amount of power of the mobile terminal K100. For example, the remaining amount of power 230 is managed by a register in a device which stores a remaining amount of power in the battery, and so on. Each processing unit of the mobile terminal K100 can obtain the remaining amount of power by reading the register.

For example, when the battery in the mobile terminal K100 is internally equipped with a microcomputer and is capable of managing the remaining amount of power thereof, the register storing the remaining amount of power 230 performs the following: an A/D conversion on the voltages applied to both ends of the resistance element connected in serial to the output terminal of the battery; detection of charge and discharge electricity from the difference between the voltages; obtainment of the currently remaining amount of power 230 calculated through addition; and holding the obtained currently remaining amount of power 230.

For example, the processing A 110, the processing B 120, and the operating system 240 are executed by the CPU, and the power consumption information 112 and the power consumption information 122 are stored in the memory or the register.

First Embodiment

Processing Flow

Figure 9:
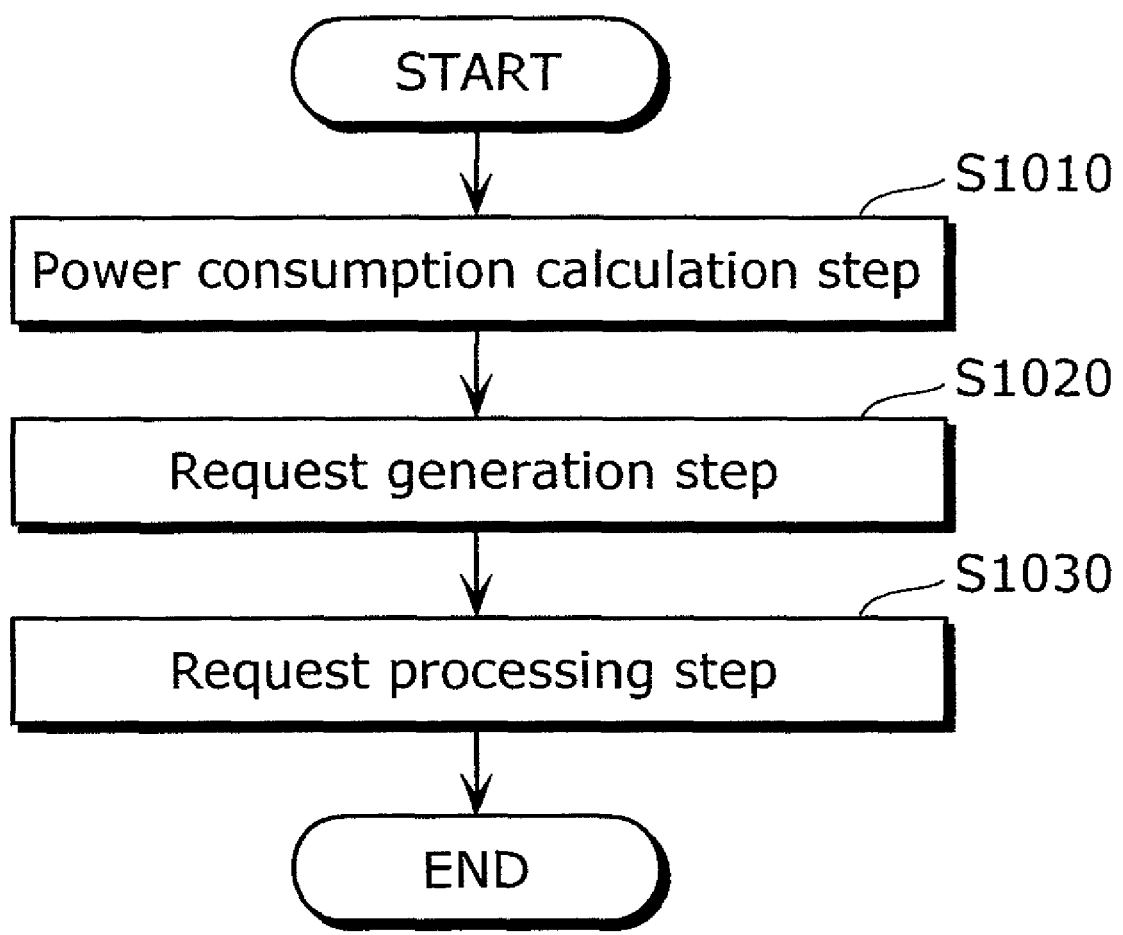
FIG. 9 is a flow chart of processing executed by the mobile terminal according to the first embodiment of the present invention.

FIG. 9 is a flow chart of the processing executed by the mobile terminal K100 according to the first embodiment.

Here, it is assumed that the mobile terminal K100 is currently executing the processing A 110, and is to execute the processing B 120 next.

When an interrupt or a periodic event occurs from the processing A 110 or the processing B 120, the power consumption calculating unit K101 calculates the power consumption information 112 (122) of the processing (S1010). It is to be noted that in the case where the processing is managed by the operating system 240, the power consumption calculating unit K101 may calculate the power consumption information 112 (the power consumption information 122) of the processing A 110 (the processing B 120) when the operating system 240 performs task dispatching. It is to be noted that the power consumption information 112 or the power consumption information 122 may be set in advance in a nonvolatile memory and the like of the mobile terminal K100.

Next, the request generating unit K102 generates a request according to a remaining amount of power (S1020). The "remaining amount of power" is obtained using a device and the like which manages the battery of the mobile terminal. A specific example is that the CPU can obtain the remaining amount of power in the battery by reading a specific external register and the like. The request generating unit K102 generates the "request" when the "remaining amount of power" falls below a predetermined threshold value. For example, the "request" may be generated when 15 Wh>"remaining amount of power".

In the case where the operating system 240 is installed, generation of the "request" can be defined as transmission, and the like, of a wake-up request, an activation request, a signal or a message for a task of the predetermined processing. In the case where the operating system 240 is not installed, the generation of the "request" can be defined as calling a function for executing the predetermined processing 200 or as generation of an interrupt request for executing the predetermined processing 200.

Next, the request processing unit K103 executes the predetermined processing 200 in response to the "request" (S1030). The predetermined processing 200 shall be described in second through seventh embodiments.

The above described processing can be achieved through execution of a program by a computer. Further, this program can be recorded on a computer-readable recording medium.

Figure 10:
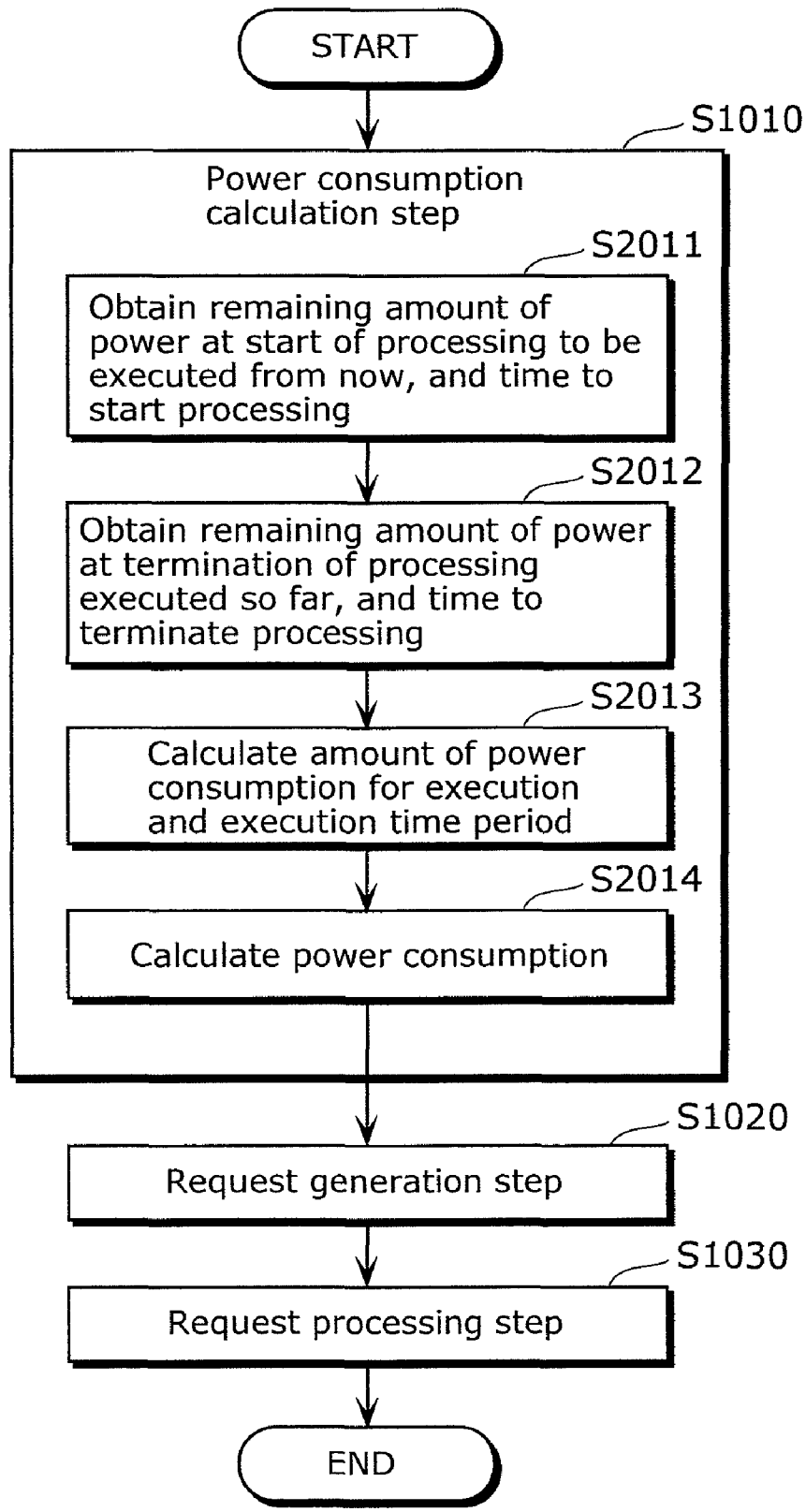
FIG. 10 is a flow chart of processing executed by the mobile terminal according to the first embodiment of the present invention.

It is to be noted that the method shown in FIG. 10 can also be used for the calculation of the power consumption information 112 (the power consumption information 122)

(S1010). More specifically, in the case where the operating system is not installed in the mobile terminal, the power consumption calculating unit K101 obtains the time at the start of the processing B 120, which is to be executed from now, and the remaining amount of power at the start of the processing B 120, at the following timings: when an interrupt occurs; when a periodic event occurs; or when calling a specific function. In the case where the operating system is installed in the mobile terminal, the power consumption calculating unit K101 obtains the same when the operating system performs task dispatching (S2011). It is to be noted that the information at the start of such processing, may not be obtained in some cases.

Next, the power consumption calculating unit K101 obtains the time at the termination of the processing A 110 executed so far and the remaining amount of power at the termination of the processing A 110 (S2012). Further, the power consumption calculating unit K101 calculates: an amount of power consumption for processing A execution; and an execution time period for processing A, which are to be described later, based on the time and the remaining amount of power at the start of the processing A 110, which have been obtained in advance (S2013). In addition, the power consumption calculating unit K101 calculates the power consumption 113 based on the amount of power consumption for processing A execution and the execution time period for processing A which have been calculated (S2014). It is to be noted that the processing in S2011, S2012 and S2013 may not be performed when the amount of power consumption and the execution time period can be obtained by accessing a specific hardware register.

It is to be noted that the power consumption 113 of the processing A can be calculated by the following expression.

Power consumption 113=Amount of power consumption for processing $A$ execution/Execution time period for processing $A$ Here, the amount of power consumption for processing A execution indicates an amount of power consumed for executing the processing A 110, and can be calculated by the following expression.

Amount of power consumption for processing $A$ execution=Remaining amount of power at the start of the processing $A$−Remaining amount of power at the termination of the processing $A$ Further, the amount of power consumption for execution may be obtained from a register which allows the obtainment of the amount of power consumption for execution through access thereto, and which can clear, manually or simultaneously with the obtainment, the amount of power consumption for execution.

The execution time period for processing A indicates a period of time for which the processing A 110 is executed, and can be calculated by the following expression.

Execution time period for processing $A$=Time at the termination of the processing $A$−Time at the start of the processing $A$ Further, the execution time period may be obtained from a register which allows the obtainment of the execution time period through access thereto, and which can clear, manually or simultaneously with the obtainment, the execution time period. Furthermore, in the case where an operating system is installed, the execution time period may be obtained by reading a register such as a specific timer, or may be obtained based on a time period for operating system management, and the like.

Figure 11:
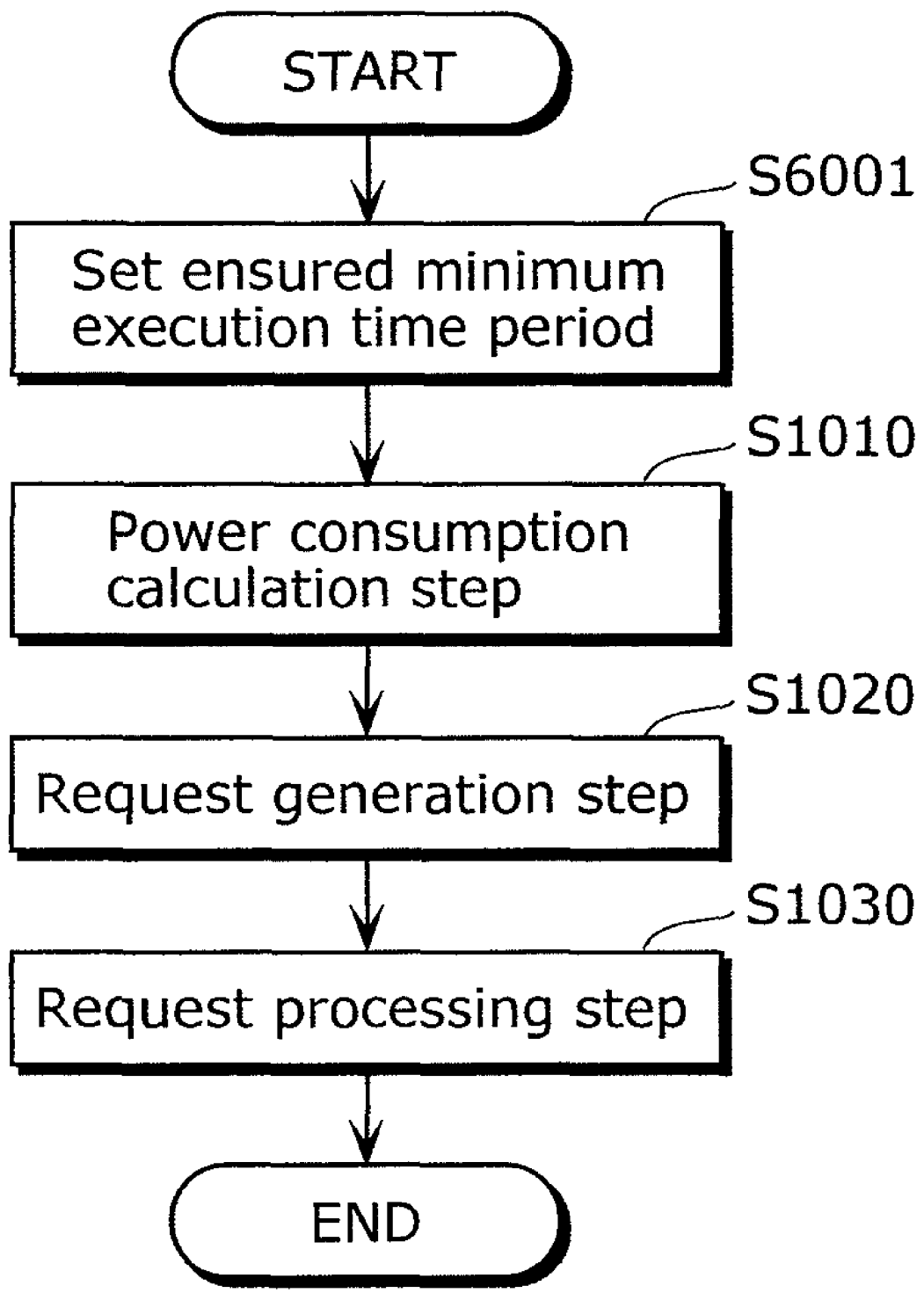
FIG. 11 is a flow chart of processing executed by the mobile terminal according to the first embodiment of the present invention.

In addition, in the case where the configuration of the processing executed by the mobile terminal K100 is the configuration shown in FIG. 5, the user or a third party who is different from the user can set a period of time for which he or she wishes to execute specific processing of the specific terminal, as the ensured minimum execution time period 114 as shown in FIG. 11 (S6001). An example of a situation where a third party, different from the user, makes the setting is where a parent sets, to his or her child's mobile phone, a minimum period of time for using the call function.

It is to be noted that by providing a specific terminal with an ensured minimum execution time period receiving unit, it is possible for a third party to remotely set an ensured minimum execution time period to the specific terminal. For example, a parent is enabled, using a mobile phone, to remotely make a setting, to his or her child's mobile phone, of a minimum period of time for using the call function. Furthermore, by providing a specific terminal with an authenticating unit, only those who have been successful in authentication may be allowed to change the ensured minimum execution time period. As a result, it is possible to restrict persons who are allowed to change the ensured minimum execution time period, and it is possible to prevent, for example, a child from changing the ensured minimum execution time period which has been set by the parent.

Further, the ensured minimum execution time period may be set in advance before the user starts using the mobile terminal. For example, setting the ensured minimum execution time period in advance at the time of manufacturing mobile phones makes it possible to ensure a minimum period of time for a call, without the need for the user to make any setting.

Figure 12:
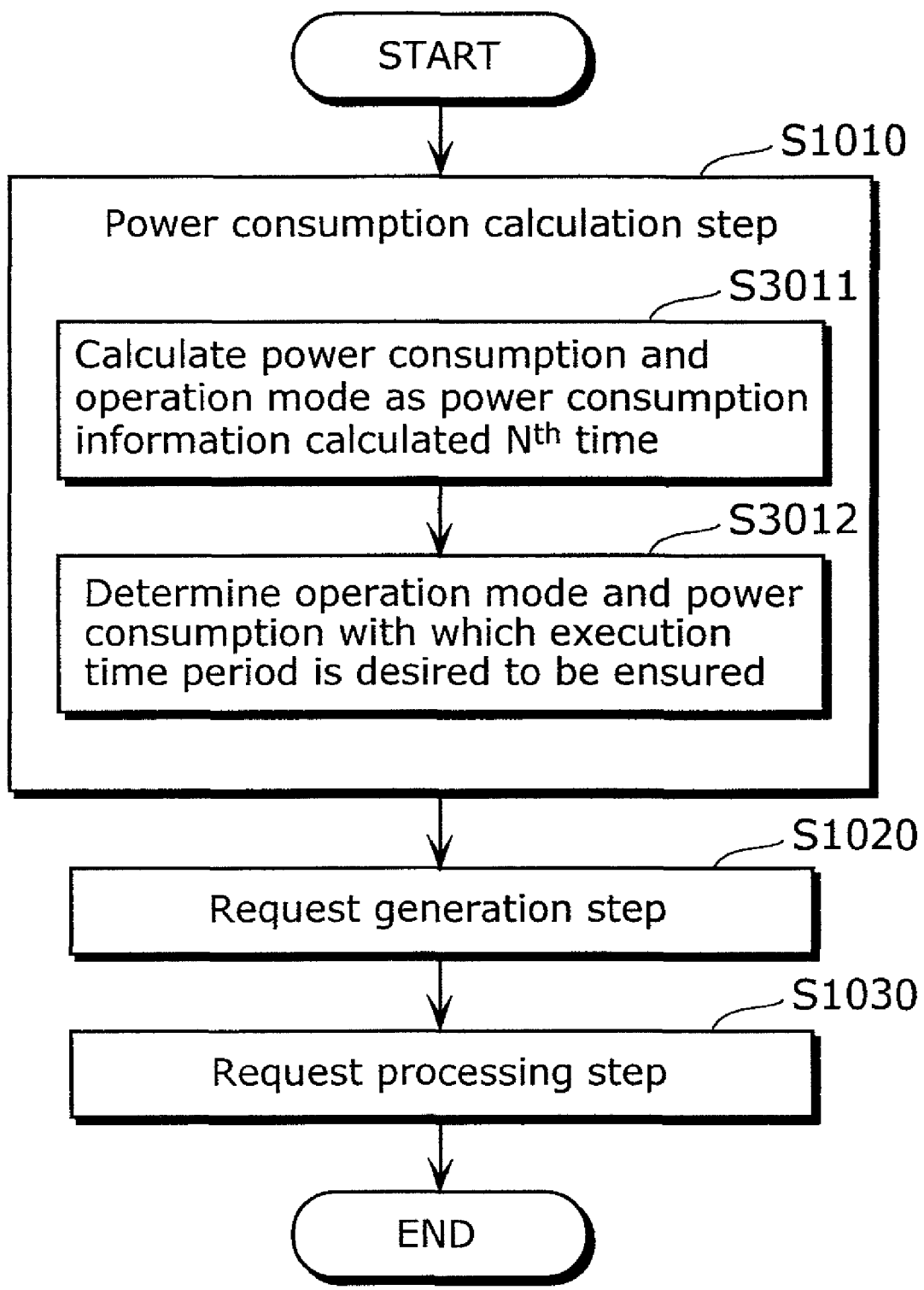
FIG. 12 is a flow chart of processing executed by the mobile terminal according to the first embodiment of the present invention.

In addition, in the case where the configuration of the processing executed by the mobile terminal K100 is the configuration shown in FIG. 7, a method shown in FIG. 12 may be used for calculating the power consumption information 112 (the power consumption information 122) (S1010 in FIG. 9).

More specifically, in the case where the operating system is not installed in the mobile terminal, the power consumption calculating unit K101 calculates, as the "power consumption information" calculated Nth time, the power consumption 113-N and the operation mode 11A-N of the "processing" at the following timings: when an interrupt occurs; when a periodic event occurs; or when calling a specific function. In the case where the operating system is installed, the power consumption calculating unit K101 calculates the same when the operating system performs task dispatching (S3011). The operation mode 11A-N of the "processing" may include a CPU operation mode, a cache hit rate, an operation mode of the mobile terminal, or the like. N is an integer starting from 1, and can go back to 1 after reaching a certain value.

Figure 13:
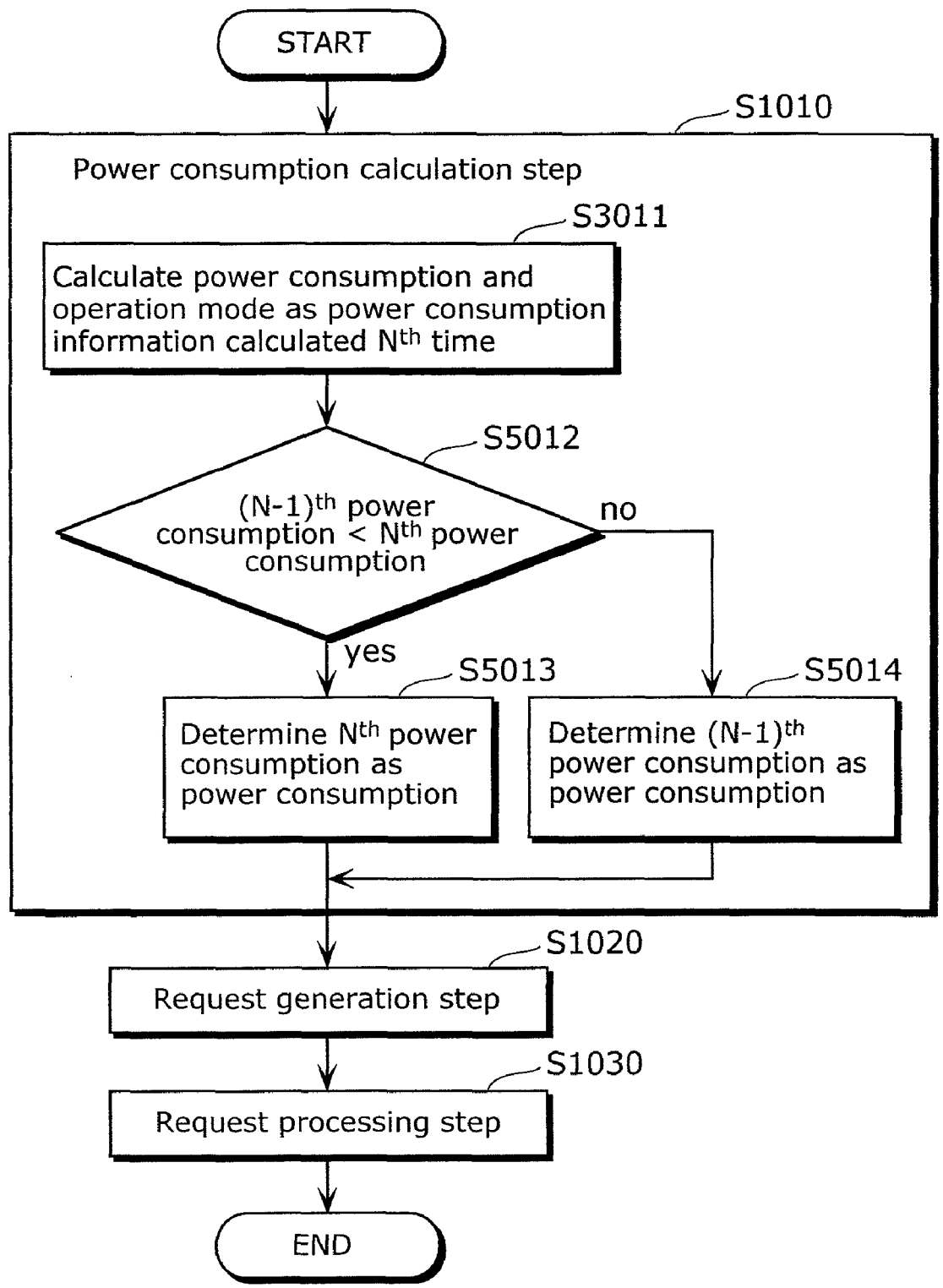
FIG. 13 is a flow chart of processing executed by the mobile terminal according to the first embodiment of the present invention.

Next, the power consumption calculating unit K101 determines, based on the arrangement, the operation mode 11A-M and the power consumption 113-M with which an execution time period is desired ensured (S3012). In the case of using, for example, a cache hit rate for determining the operation mode 11A-M and the power consumption 113-M, the method for the determination based on the arrangement is to search for the operation mode 11A-M used when the cache hit rate is equal to or larger than a specific value (90%, for example), and to select from the arrangement the power consumption 113-M corresponding to the operation mode 11A-M. Further, in the case where the operation mode 11A-M is the operation mode of the CPU, the operation mode of the mobile terminal, or the like, then the power consumption 113-N when the operation mode 11A-N is a power saving mode, may be selected. Furthermore, the power consumption 113-N may be determined based on a combination of two or more operation modes. In addition, as shown in FIG. 13, when the power consumption 113-N calculated this time is larger than the power consumption 113-(N−1) calculated last time (yes in S5012), the power consumption 113-N can be selected from the arrangement as the power consumption 113-M (S5013). Furthermore, when the power consumption 113-(N−1) calculated last time is equal to or larger than the power consumption 113-N calculated this time (no in S5012), the power consumption 113-(N−1) can be selected from the arrangement as the power consumption 113-M (S5014).

It is to be noted that when, as shown in FIG. 6, the power consumption information is not managed based on arrangement, the number of times the power consumption information is calculated may be recorded to calculate an average of the power consumption 113. For example, an average of the power consumption 113 can be calculated by the following expression.

Figure 14:
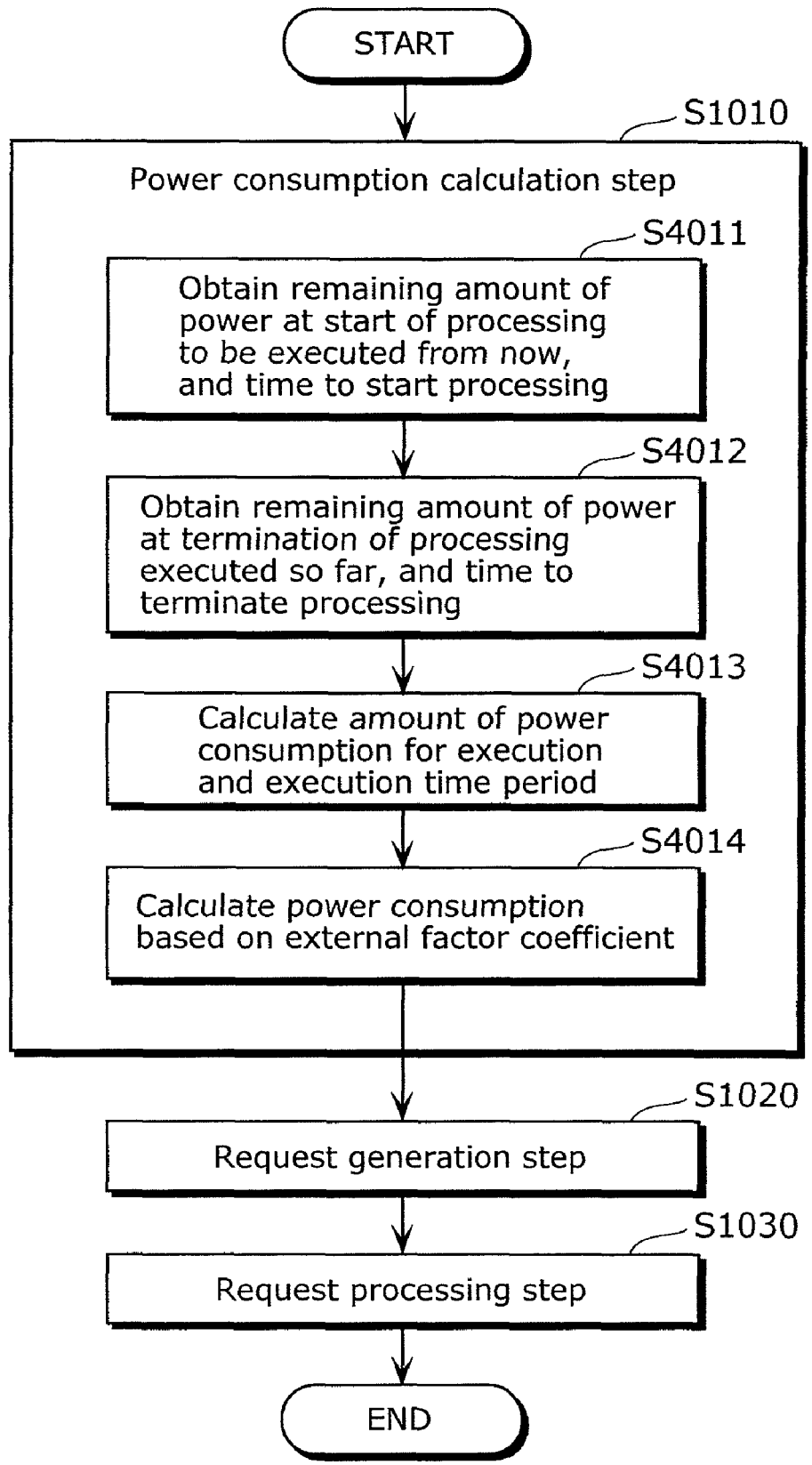
FIG. 14 is a flow chart of processing executed by the mobile terminal according to the first embodiment of the present invention.

Average of the power consumption 113=(((Average of power consumptions 113 previously calculated)× (Number of times of calculation−1))+Power consumption 113 calculated this time)/Number of times of calculation In addition, in the case where the configuration of the processing executed by the mobile terminal K100 is the configuration shown in FIG. 8, a method shown in FIG. 14 may be used for calculating the power consumption information 112 (the power consumption information 122) (S1010 in FIG. 9).

More specifically, in the case where the operating system is not installed in the mobile terminal, the power consumption calculating unit K101 obtains the time at the start of the processing B 120, which is to be executed from now, and the remaining amount of power at the start of the processing B 120, at the following timings: when an interrupt occurs; when a periodic event occurs; or when calling a specific function. In the case where the operating system is installed, the power consumption calculating unit K101 obtains the same when the operating system performs task dispatching (S4011). It is to be noted that the information at the start of such processing may not be obtained in some cases.

Next, the power consumption calculating unit K101 obtains the time at the termination of the processing A 110 executed so far and the remaining amount of power at the termination of the processing A 110 (S4012). Further, the power consumption calculating unit K101 calculates the amount of power consumption for processing A execution and the execution time period for processing A, based on the time and the remaining amount of power at the start of the processing A 110, which have been obtained in advance (S4013). Furthermore, the power consumption calculating unit K101 calculates the power consumption 113 using the amount of power consumption for processing A execution, the execution time period for processing A, and the external factor coefficient 117 (S4014). It is to be noted that the processing in S4011, S4012 and S4013 may not be performed when the amount of power consumption and the execution time period can be obtained by accessing a specific hardware register.

The power consumption 113 of the processing A can be calculated by the following expression.

Power consumption 113=Amount of power consumption for processing A execution/Execution time period for processing A×External factor coefficient 117

For example, given that the external factor coefficient is 1 when the cache hit rate is 81%, the power consumption 113 can be more accurately calculated by setting the external factor coefficient to 0.9 when the cache hit rate is 90%.

It is to be noted that the amount of power consumption for processing A execution indicates an amount of power consumed for executing the processing A 110, and can be calculated by the following expression.

Amount of power consumption for processing A execution=Remaining amount of power at the start of the processing A−Remaining amount of power at the termination of the processing A Further, the amount of power consumption for execution may be obtained from a register which allows the obtainment of the amount of power consumption for execution through access thereto, and which can clear, manually or simultaneously with the obtainment, the amount of power consumption for execution.

The execution time period for processing A indicates a period of time for which the processing A 110 is executed, and can be calculated by the following expression.

Execution time period for processing A=Time at the termination of the processing A−Time at the start of the processing A The execution time period may be obtained from a register which allows the obtainment of the execution time period through access thereto, and which can clear, manually or simultaneously with the obtainment, the execution time period. Furthermore, in the case where an operating system is installed, the execution time period may be obtained by reading a register such as a specific timer, or may be obtained from a time period for operating system management and the like.

Figure 15:
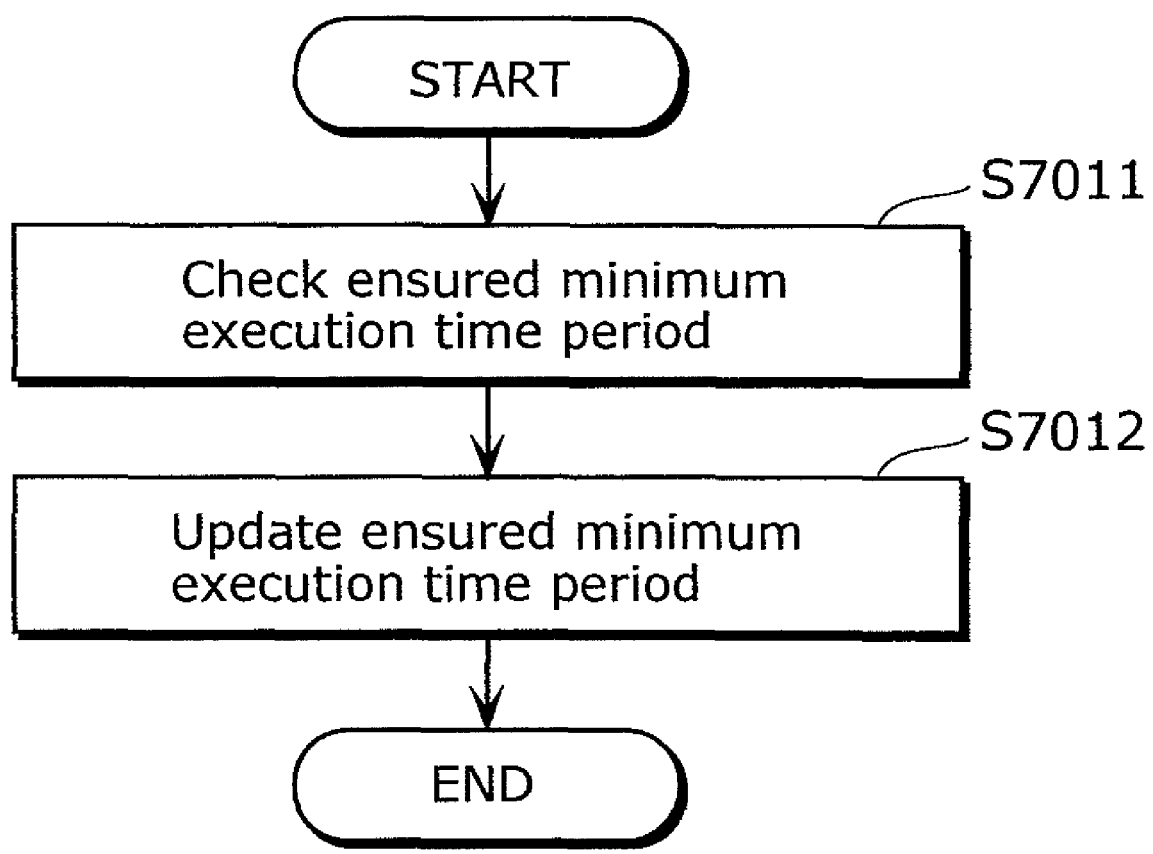
FIG. 15 is a flow chart of processing executed by the mobile terminal according to the first embodiment of the present invention.

FIG. 15 is a flow chart showing an example of a flow of processing executed by the mobile terminal, and it shows a method for updating the "ensured minimum execution time period".

In the case where the operating system is not installed in the mobile terminal, the power consumption calculating unit K101 checks the ensured minimum execution time period at the following timings: when an interrupt occurs; when a periodic event occurs; or when calling a specific function. In the case where the operating system is installed, the power consumption calculating unit K101 checks the same at a specific timing such as when the operating system performs task dispatching (S7011).

Next, the power consumption calculating unit K101 obtains the period of time required for executing processing, to update the ensured minimum execution time period (S7012). It is to be noted that the updated ensured minimum execution time period can also be calculated by the following expression.

Updated ensured minimum execution time period=Pre-update ensured minimum execution time period−Time required for executing the processing It is to be noted that when the ensured minimum execution time period becomes short, it is possible to re-set the ensured minimum execution time period. In setting the ensured minimum execution time period, according to a priority of each processing, the ensured minimum execution time period of the processing having a lower priority can be transferred to the ensured minimum execution time period of the processing having a higher priority.

It is to be noted that a method can also be used by which the ensured minimum execution time period is gradually decremented in accordance with the real time slots. For example, in the case where the ensured minimum execution time period is set to 10 minutes at 9 o'clock, the ensured minimum execution time period can be re-set to 5 minutes at 12 o'clock, and to 1 minute at 19 o'clock, and so on. In addition, another method can be used by which the ensured minimum execution time period is decremented by a predetermined value at every unit of time.

Figure 16:
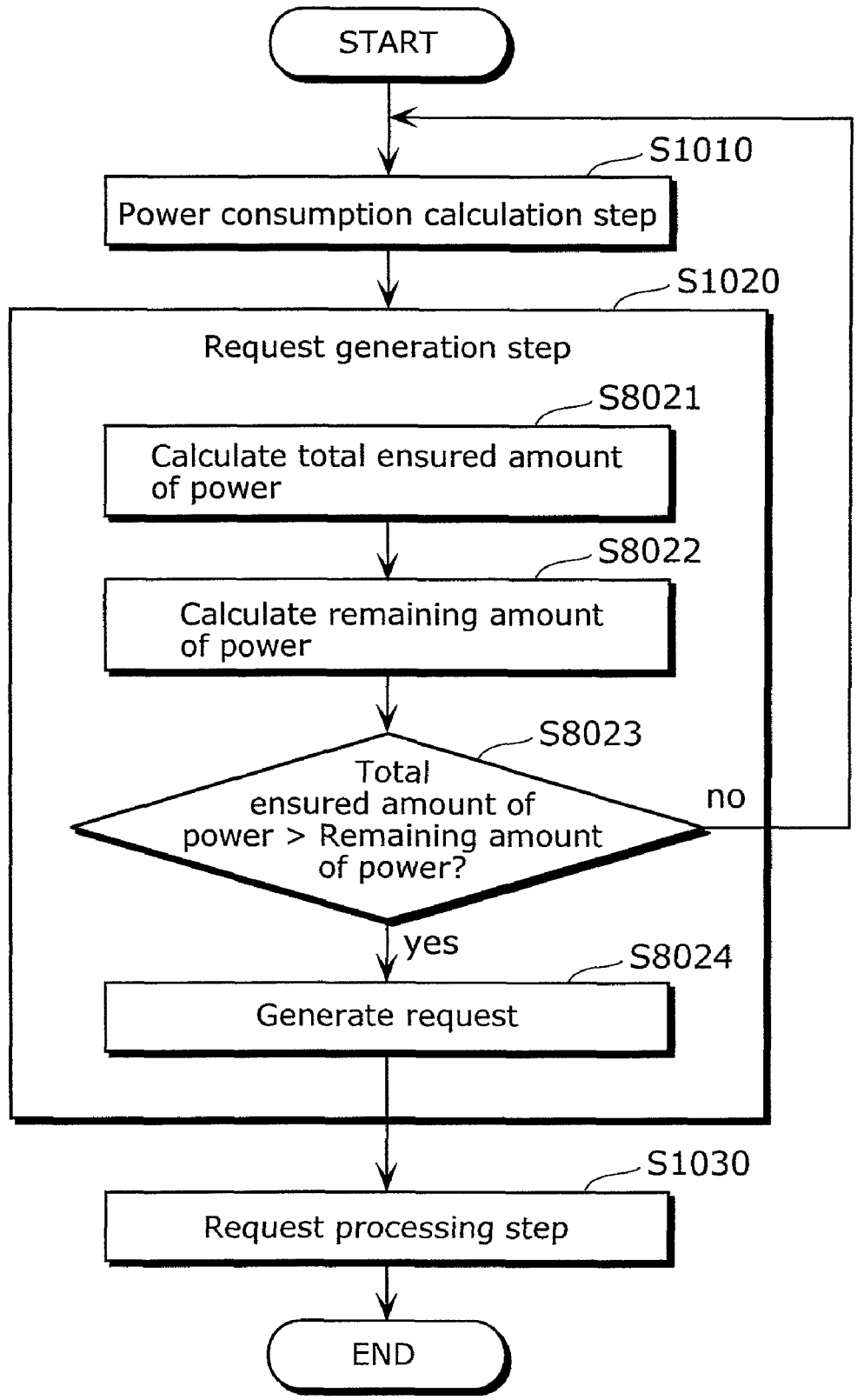
FIG. 16 is a flow chart of processing executed by the mobile terminal according to the first embodiment of the present invention.

Furthermore, FIG. 16 is a flow chart of the processing executed by the mobile terminal for calculating a total ensured amount of power 220 (S1020 in FIG. 9). The configuration of the processing performed by the mobile terminal K100 when executing the above mentioned processing is assumed to be the configuration shown in FIG. 6.

In the case where the operating system is not installed in the mobile terminal, the request generating unit K102 calculates the total ensured amount of power 220 (S8021) and the remaining amount of power 230 (S8022) at the following timings: when an interrupt occurs; when a periodic event occurs; or when calling a specific function. In the case where the operating system is installed in the mobile terminal, the request generating unit K102 may calculate the total ensured amount of power 220 and the remaining amount of power 230 when the operating system performs task dispatching.

The total ensured amount of power 220 is calculated as a sum of ensured amounts of power of all the processing. The ensured amount of power 118 is an amount of power consumed when the processing A 110 is executed only for the ensured minimum execution time period 114.

Ensured amount of power 118=Power consumption 113×Ensured minimum execution time period 114

For example, in the case where the configuration of the processing is the one shown in FIG. 6, the processing A 110 and the processing B 120 constitute all the processing, and thus the total ensured amount of power 220 is calculated by the following expression.

Total ensured amount of power 220=Ensured amount of power 118 of the processing A+Ensured amount of power 128 of the processing B It is to be noted that the power consumption information may manage an amount of power, as a remaining-amount-of-power threshold value, to be left to ensure the execution of the processing for the ensured minimum execution time period. Adding the remaining-amount-of-power threshold value to the sum of the ensured amounts of power of all the processing enables the amount of power to be more accurately ensured, and enables the calculation of the total ensured amount of power 220 by the following expression.

Total ensured amount of power 220=Ensured amount of power 118 of the processing A+Ensured amount of power 128 of the processing B+Remaining-amount-of-power threshold value Here, the remaining-amount-of-power threshold value may be freely set by the user in advance, or be set in advance by a system other than the user.

It is to be noted that as the remaining-amount-of-power threshold value, an amount of power may be specified which is consumed for being on standby, that is, for example, an amount of power consumed for the mobile terminal to be on standby in one day.

Further, as the remaining-amount-of-power threshold value, an amount of power may be specified which includes in advance: an amount of power consumed by the operating system processing; and an amount of power necessary for executing the predetermined processing 200, which is, for example, giving a warning to the mobile terminal.

Furthermore, in the case of calculating the total ensured amount of power 220, the request generating unit K102 compares the calculated total ensured amount of power 220 and the remaining amount of power 230 (S8023), and generates a request when the total ensured amount of power 220 is larger than the remaining amount of power 230 (yes in S8023) (S8024).

Next, the following shall describe, with reference to FIG. 17 through FIG. 21, an example of an operation performed when the mobile terminal described in the above embodiment is used for a mobile phone.

At first, the user sets in advance the ensured minimum execution time period 114 or 124 of each function. Here, it is assumed that: the ensured minimum execution time period of the call function is set to 200 seconds; the ensured minimum execution time period of the mail function is set to 250 seconds; and the ensured minimum execution time period of other functions (the camera function, the game function, the Internet function) are not set (set values=0 seconds).

Further, each of the values shown in FIG. 17 is registered as an initial value of the power consumption 113 or 123 of each function. Here, as initial values, the following power consumption values are registered: 0.05 for the call function; 0.02 for the mail function; 0.20 for the camera function; 0.375 for the game function; and 0.05 for the Internet function, and each of these initial values is updated every time the user uses the corresponding function. Furthermore, the power consumption is updated when processing is switched.

The following shall describe an example of updating the power consumption.

With reference to FIG. 18, when assuming that: at time T0, the time at the start of a mail=0 and the remaining amount of power at the start of the mail=100; and at time T1, the time at the termination of the mail=100 and the remaining amount of power at the termination of the mail=98, the expression for calculating power consumption is as follows:

Power consumption of the mail function at time T1 at the termination of the mail=(Difference between Remaining amount of power at the start of the mail and Remaining amount of power at the termination of the mail)/(Difference between Time at the termination of the mail and Time at the start of the mail)=(100−98)/(100−0)=0.02

Figure 19:
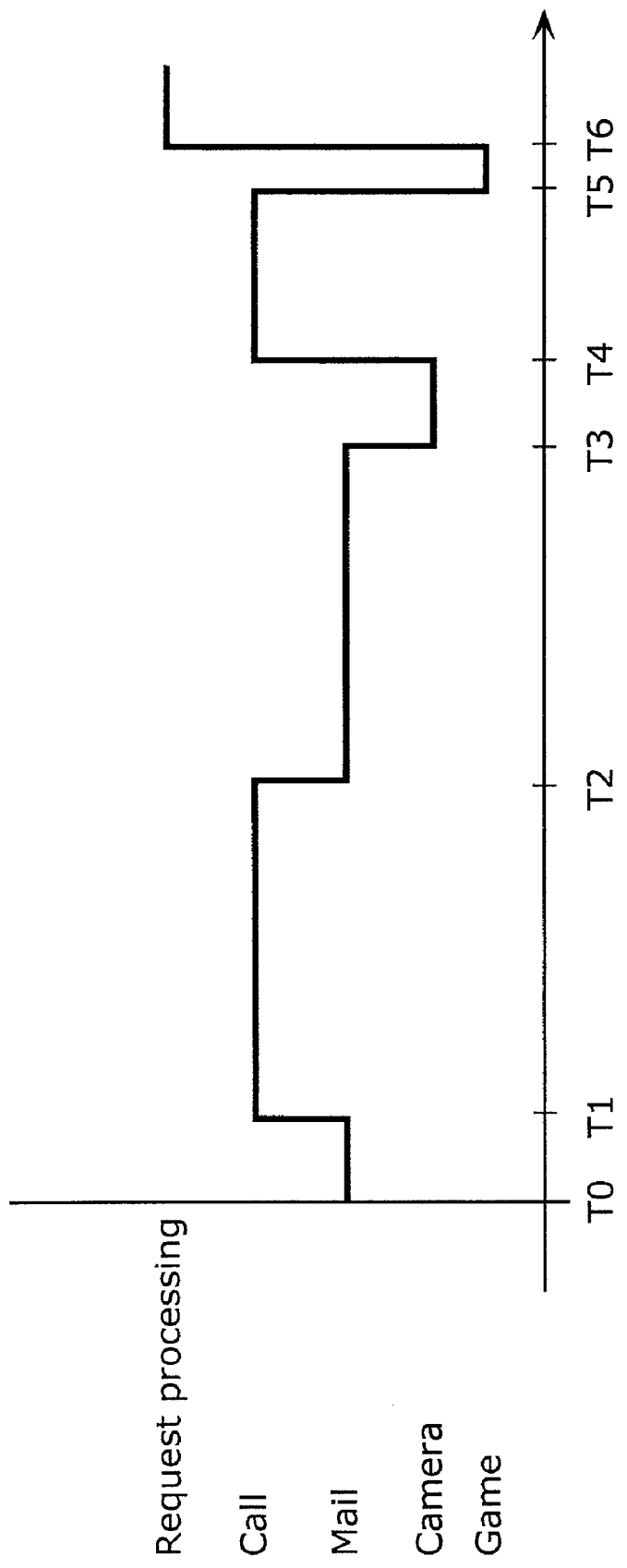
FIG. 19 is a graph showing an example of transitions up to the generation of a request according to the first embodiment of the present invention.

Here, 0.02 has been set as an initial value of the power consumption of the mail function, and since this value is equal to the power consumption calculated this time as above, the power consumption is not updated. As shown in FIG. 19, when assuming that: the user starts a call immediately after terminating the mail; and that at time T2, the time at the termination of the call=500 and the remaining amount of power at the termination of the call=78, the calculation is as follows:

Power consumption of the call function=(98−78)/(500−100)=0.05

This shows that the value calculated this time as above is equal to the initial value set to 0.05, and thus the power consumption of the call function is not updated.

When assuming that: the user starts a mail immediately after terminating the call; and that at time T3, the time at the termination of the mail=900 and the remaining amount of power at the termination of the mail=68, the calculation is as follows:

Power consumption of the mail function=(78−68)/(900−500)=0.025

This calculation shows that the calculated power consumption of the mail function is larger than the power consumption of the mail function already set (0.02). Thus, in this case, the power consumption of the mail function is updated to the calculated value 0.025.

When assuming that: the user activates the camera immediately after terminating the mail; and that at time T4, the time at the termination of the camera=1000 and the remaining amount of power at the termination the camera=50, the calculation is as follows:

Power consumption of the camera function=(68−50)/(1000−900)=0.18

This calculation shows that the power consumption of the camera function is smaller than the initial value set to 0.20, and thus the power consumption is not updated.

As described above, by updating the power consumption only when the value of power consumption is larger than the value of the power consumption already set, the value of power consumption which is maximum among the values of power consumption calculated so far is recorded.

When the power consumption is updated, the ensured amount of power is also updated, because the ensured amount of power is calculated by the following expression.

Ensured amount of power=Power consumption×Ensured minimum execution time period

The total ensured amount of power is calculated as a sum of the ensured amounts of power, and at time T4 in FIG. 18, it is calculated as follows:

Total ensured amount of power=(0.05×200)+(0.025×250)+(0.2×0)=16.25

Figure 20:
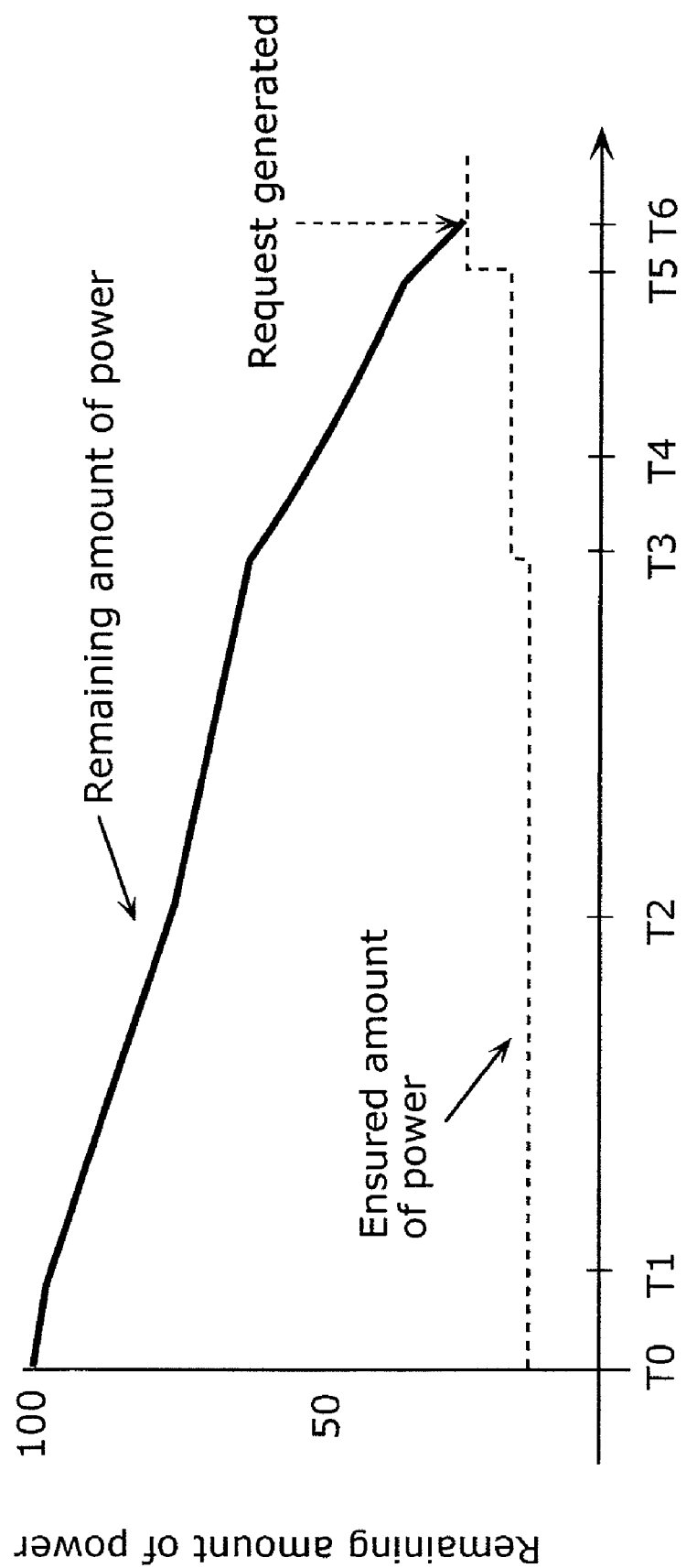
FIG. 20 is a graph showing an example of transitions of the remaining amount of power and the ensured amount of power according to the first embodiment of the present invention.

As shown in FIG. 20, it is assumed that the processing is executed as in FIG. 19 and the user starts a game from time T5, and that the remaining amount of power reaches 26.25 at time T6=1210. Here, comparison between the remaining amount of power (26.25) and the total ensured amount of power (26.25) shows that the remaining amount of power is equal to or smaller than the total ensured amount of power. Thus, the request generating unit K102 generates a request. Here, the request may be a message transmitted for predetermined processing.

Next, having received the message, the predetermined processing displays a warning on a liquid crystal display of the mobile phone, for example, as the predetermined processing. Executing such processing enables calling of attention to the user and suppression of the power consumption, which allows ensuring of the processing execution for the ensured minimum execution time period set in advance.

FIG. 21 is a table showing a relationship between the remaining amount of power, the amount of power consumption, and the power consumption of each processing to be executed.

For example, when the time T1=100, the mail function is terminated and the call function is started. At this point, it is shown that the remaining amount of power is 98, the amount of power consumption is 2, and the power consumption of the mail function is 0.02 which is equal to the initial value of this power consumption, that is 0.02. Further, at the time T3, the mail function is terminated and the camera function is started. The figure shows that at this point, the remaining amount of power is 68, the amount of power consumption is 10, and the power consumption of the mail function is 0.025 which is larger than the already calculated power consumption of the mail function, that is 0.02, and thus the power consumption of the mail function is updated to 0.025.

First Embodiment

Advantageous Effect

The mobile terminal of the present embodiment can calculate the amount of power consumption of various functions of the mobile terminal without receiving power consumption information from an external source. As a result, the user can use other functions while leaving a necessary amount of power consumption of one or more functions.

Further, the user can use other functions of the mobile terminal while leaving an amount of power consumption necessary for executing the various functions of the mobile terminal for a specified period of time.

Furthermore, the user can use other functions of the mobile terminal while leaving an amount of power consumption necessary for executing the various functions of the mobile terminal for a period of time specified for every operation mode.

In addition, the mobile terminal can more accurately calculate a period of time for which other functions of the mobile terminal can be used, while "ensuring" to leave an amount of power in the battery necessary for executing the various functions of the mobile terminal for a specified period of time.

Further, the mobile terminal can switch between power consumption calculation functions of the mobile terminal according to each user's usage style; for example, the mobile terminal can allocate more power to ordinary functions by executing a specified function of the mobile terminal for an average period of time. As a result, the convenience of the user for the mobile terminal is enhanced.

Further, the user can, for example, leave an amount of power in the battery necessary for executing the call function of a child's mobile phone for a period of time specified by the parent, and thus it is possible for the user to prevent a situation where the parent cannot contact the child due to battery exhaustion. Moreover, setting an ensured minimum execution time period in advance at the time of manufacturing mobile phones makes it possible to ensure a minimum period of time for a call, without the need for the user to make any setting, and thus it is possible to prevent a situation where the user cannot make a call in the case of disasters or emergency due to battery exhaustion caused by the user's failure in remembering to make the setting.

Second Embodiment

A mobile terminal according to the second embodiment is characterized by outputting a message as predetermined processing.

Second Embodiment

Configuration

Figure 22:
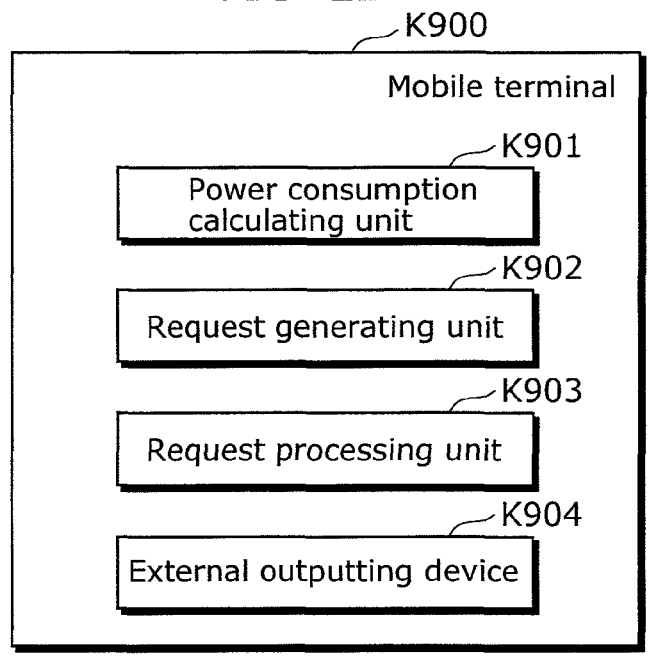
FIG. 22 is a diagram showing a functional configuration of a mobile terminal according to a second embodiment of the present invention.

FIG. 22 is a diagram showing a functional configuration of the mobile terminal according to the present embodiment.

A mobile terminal K900 includes a power consumption calculating unit K901, a request generating unit K902, and a request processing unit K903. The mobile terminal K900 may further include an external outputting device K904.

The mobile terminal K900 is a mobile device which is battery-operated and is portable. More specifically, examples of the mobile terminal K900 include mobile phones, PHS, PDA, mobile game machines, and laptop computers. The power consumption calculating unit K901 and the request generating unit K902 have the same configuration as that of the power consumption calculating unit K101 and the request generating unit K102 of the first embodiment, respectively. The request processing unit K903 is a processing unit which executes processing for outputting a message. It executes processing for outputting a picture, a character string, or audio, for example. The external outputting device K904 is an outputting device such as a liquid crystal display or a speaker.

The configuration of processing executed by the mobile terminal according to the second embodiment is the same as the configuration of the processing shown in the first embodiment.

Second Embodiment

Processing Flow

Figure 23:
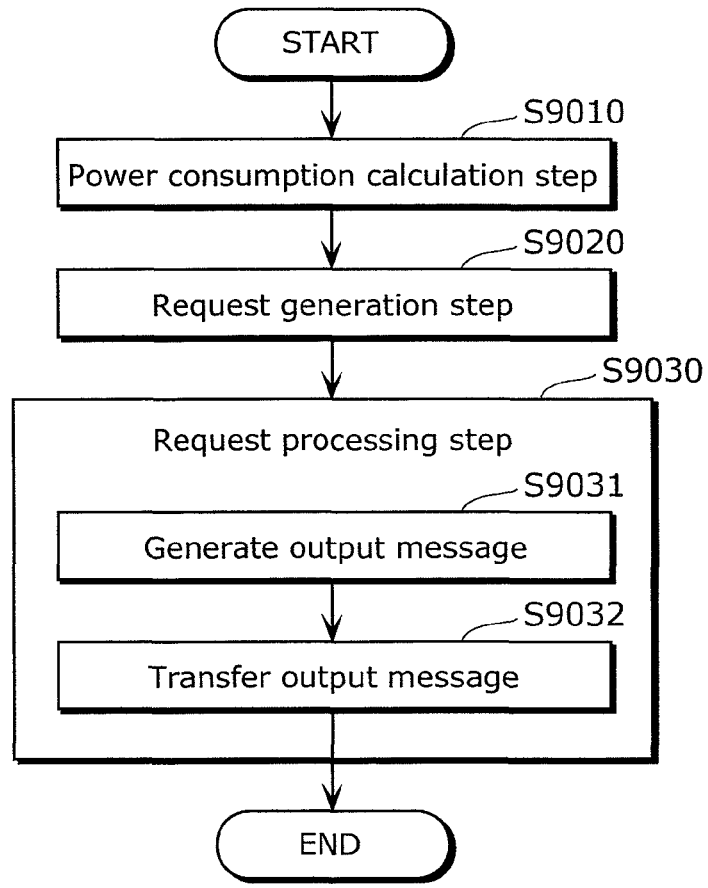
FIG. 23 is a flow chart of processing executed by the mobile terminal according to the second embodiment of the present invention.

FIG. 23 is a flow chart showing an example of a flow of processing executed by the mobile terminal according to the second embodiment.

The power consumption calculating unit K901 calculates the "power consumption information" (the power consumption information 112 or the power consumption information 122) of the "processing" (the processing A 110 or the processing B 120) (S9010). Next, the request generating unit K902 generates the "request" according to the "remaining amount of power" (the remaining amount of power 230) (S9020). The processing of S9010 and S9020 are the same as the processing of S1010 and S1020, respectively, which are shown in FIG. 9 of the first embodiment.

Next, the request processing unit K903 executes the "predetermined processing" (the predetermined processing 200) in response to the "request" (S9030). As the "predetermined processing", the request processing unit K903 first generates an output message in response to the "request" (S9031). The output message generated is for example a character string which gives a warning to the user that there is only a small amount of power remaining in the battery. It is to be noted that the output message may be a character string indicating the obtained "remaining amount of power", or a character string notifying a time period for which a function can be used, which is calculated for each function based on the "remaining amount of power" and the "power consumption" (the power consumption 113 or the power consumption 123). Furthermore, the output message may be a flash pattern signal of Light Emitting Diode (LED), image data for animation, an oscillation pattern signal for vibration, audio data, or the like.

Next, the request processing unit K903 transfers the output message to the external outputting device K904 (S9032). To be more specific, the request processing unit K903 may transfer the output message to the external outputting device K904 by writing the output message to a specific external register and the like.

Second Embodiment

Advantageous Effect

According to the mobile terminal of the second embodiment, output of a message is possible as predetermined processing. Outputting a message enables: the mobile terminal to notify the user of the remaining amount of power in the battery and so on; and the user to take an appropriate action in response to the message outputted. For example, the user can take such an appropriate action as stop using each function (the call function, the camera function, the game function, the Internet function, and the like), or charge the battery, thereby preventing such a situation as where a call cannot be made due to battery exhaustion.

Third Embodiment

A mobile terminal according to a third embodiment is characterized by switching between operation modes as the "predetermined processing".

Third Embodiment

Configuration

The functional configuration of the mobile terminal according to the third embodiment is the same as the functional configuration of the mobile terminal according to the first embodiment shown in FIG. 2.

Further, the configuration of processing executed by the mobile terminal according to the third embodiment is the same as the configuration of the processing shown in the first embodiment.

Third Embodiment

Processing Flow

Figure 24:
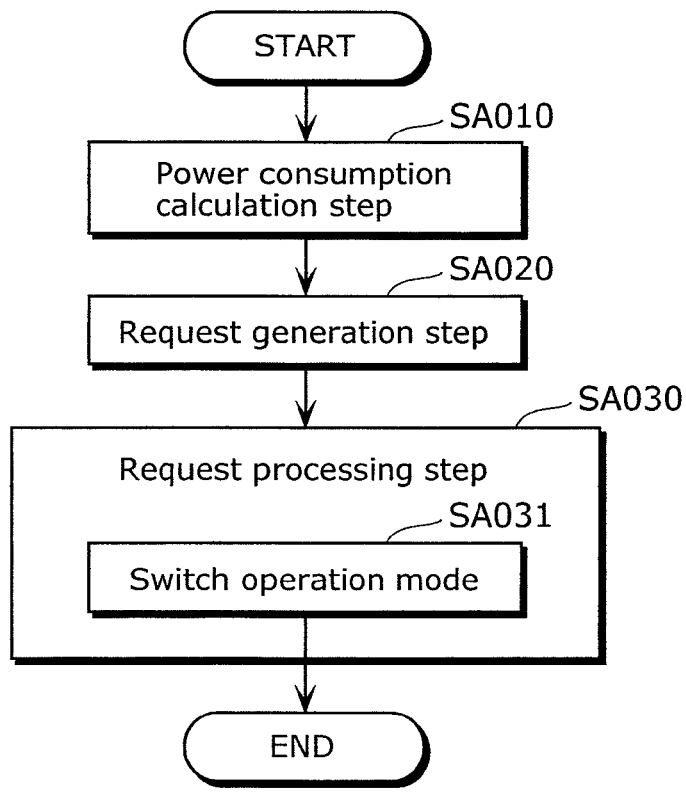
FIG. 24 is a flow chart of processing executed by a mobile terminal according to a third embodiment of the present invention.

FIG. 24 is a flow chart showing an example of a flow of processing executed by the mobile terminal according to the third embodiment.

The power consumption calculating unit K101 calculates the "power consumption information" (the power consumption information 112 or the power consumption information 122) of the "processing" (the processing A 110 or the processing B 120) (SA010). Next, the request generating unit K102 generates the "request" according to the "remaining amount of power" (the remaining amount of power 230) (SA020). The processing of SA010 and SA020 are the same as the processing of S1010 and S1020, respectively, which are shown in FIG. 9 of the first embodiment.

Next, the request processing unit K103 executes the "predetermined processing" (the predetermined processing 200) in response to the "request" (SA030). As the "predetermined processing", the request processing unit K103 switches between the operation modes of the mobile terminal in response to the "request" (SA031). To be more specific, by writing a predetermined value to a specific register of the CPU, the request processing unit K103 performs the following, for example: changing the operation frequency of the CPU; powering off a specific device of the mobile terminal; changing the luminance of the liquid crystal display; switching the videophone mode currently used by the mobile terminal to an ordinary, audio-only call mode; changing the transfer speed of the Internet function currently used by the mobile terminal; switching from a mode for reproducing music data when receiving a call and the like, to a mode for reproducing a general sound or to a silent mode; automatically powering off the entire mobile terminal for emergency; or automatically powering off a specific device of the mobile terminal and then periodically monitoring the mail inbox, disaster information obtainment, the answering machine service, and the like.

Third Embodiment

Advantageous Effect

According to the mobile terminal of the third embodiment, switching between operation modes is possible as the "predetermined processing". As a result, switching an operation mode to a power-saving mode allows suppression of power consumption of the mobile terminal to ensure a remaining amount of power in the battery, thereby it is possible to prevent such a situation as where a call cannot be made due to battery exhaustion.

Further, it is possible to save power to use a necessary function in a contingency.

Fourth Embodiment

A mobile terminal according to a fourth embodiment is characterized by notifying another terminal of various information, as the "predetermined processing".

Fourth Embodiment

Configuration

Figure 25:
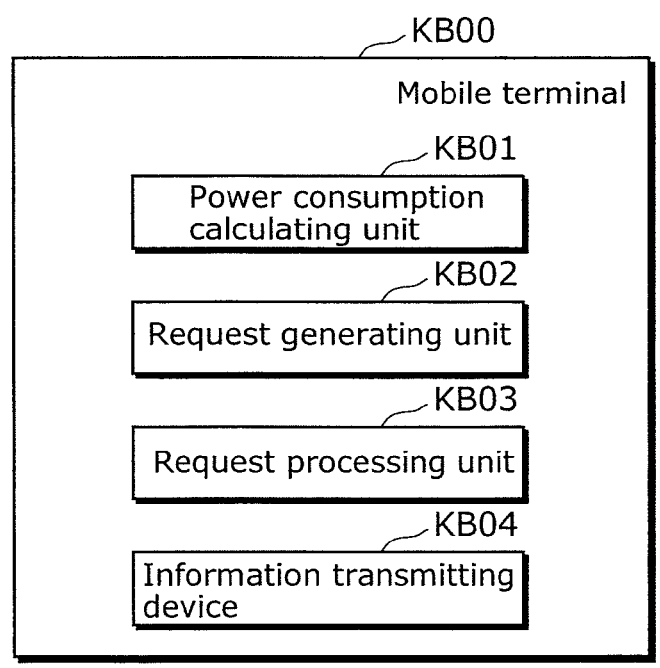
FIG. 25 is a diagram showing a functional configuration of a mobile terminal according to a fourth embodiment of the present invention.

FIG. 25 is a diagram showing a functional configuration of the mobile terminal according to the present embodiment.

A mobile terminal KB00 includes a power consumption calculating unit KB01, a request generating unit KB02, and a request processing unit KB03. The mobile terminal KB00 may further include an information transmitting device KB04.

The mobile terminal KB00 is a mobile device which is battery-operated and is portable. More specifically, examples of the mobile terminal KB00 include mobile phones, PHS, PDA, mobile game machines, and laptop computers. The power consumption calculating unit KB01 and the request generating unit KB02 have the same configuration as that of the power consumption calculating unit K101 and the request generating unit K102 of the first embodiment, respectively. The request processing unit KB03 is a processing unit which executes processing for notifying another receiving terminal of various information. For example, it executes processing for transmitting information concerning a remaining amount of power and so on to another receiving terminal. The information transmitting device KB04 is a transmitting device for transmitting information to another receiving terminal.

The configuration of processing executed by the mobile terminal according to the fourth embodiment is the same as the configuration of the processing shown in the first embodiment.

Fourth Embodiment

Processing Flow

Figure 26:
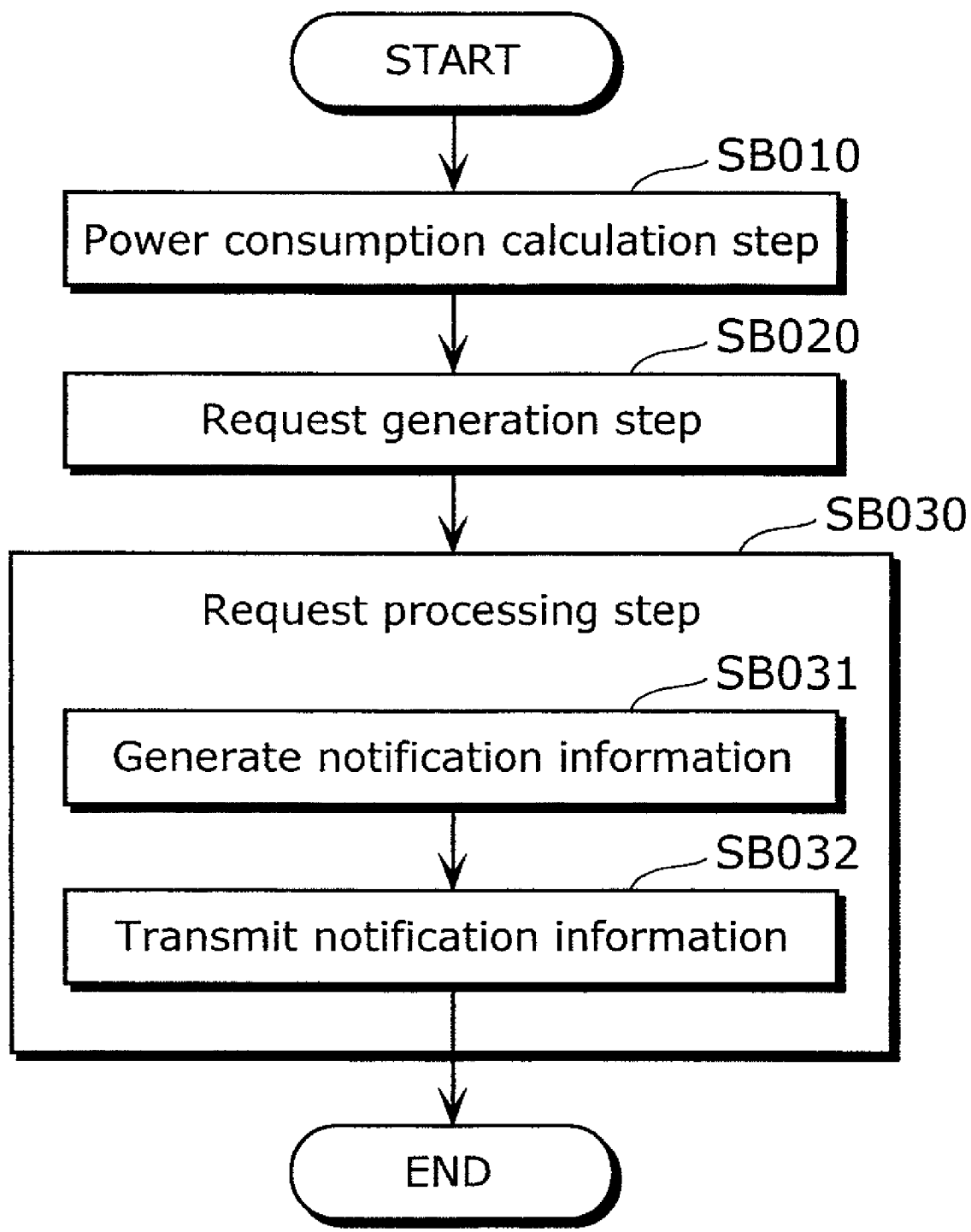
FIG. 26 is a flow chart of processing executed by the mobile terminal according to the fourth embodiment of the present invention.

FIG. 26 is a flow chart showing an example of a flow of processing executed by the mobile terminal according to the fourth embodiment.

The power consumption calculating unit KB01 calculates the "power consumption information" (the power consumption information 112 or the power consumption information 122) of the "processing" (the processing A 110 or the processing B 120) (SB010). Next, the request generating unit KB02 generates the "request" according to the "remaining amount of power" (the remaining amount of power 230) (SB020). The processing of SB010 and SB020 are the same as the processing of S1010 and S1020, respectively, which are shown in FIG. 9 of the first embodiment.

Next, the request processing unit KB03 executes the "predetermined processing" (the predetermined processing 200) in response to the "request" (SB030). As the "predetermined processing", the request processing unit KB03 first generates notification information in response to the "request" (SB031). The notification information generated is for example information notifying another terminal that there is only a small amount of power remaining in the battery of the mobile terminal KB00. It is to be noted that the notification information may be a value of the obtained "remaining amount of power" (the remaining amount of power 230), or a value of a time period for which a function can be used, which is calculated for each function based on the "remaining amount of power" and the "power consumption" (the power consumption 113 or the power consumption 123). Further, the notification information may be information on the current position and the like of the mobile terminal KB00.

Next, the request processing unit KB03 transmits the generated notification information to another terminal using the information transmitting device KB04 (SB032). The information transmitting device KB04 may transmit the notification information to another terminal through the request processing unit KB03 writing the notification information to a specific external register and the like.

For example, when the other terminal is a parent's mobile terminal, a warning can be automatically transmitted to the parent's mobile terminal when there is only a small amount of power remaining in the child's mobile terminal.

Further, an alarm sound or the like can be automatically transmitted to a terminal on the other end of the communication when there is only a small amount of power remaining.

Furthermore, a notification can be transmitted to a car navigation system to request for a search for a charging facility, when there is only a small amount of power remaining.

In addition, a request can be transmitted to another recorder to record program information currently viewed by the mobile terminal, when there is only a small amount of power remaining.

Fourth Embodiment

Advantageous Effect

According to the mobile terminal of the fourth embodiment, notifying another terminal of various information is possible as the "predetermined processing". Notifying another terminal of various information enables a person, other than the user, to be notified of the amount of power remaining in the battery, and so on, and the person receiving the notification can take an appropriate action in response to the notification. For example, by notifying the terminal used by the person on the other end of the communication when there is only a small amount of power remaining, an appropriate action can be taken such as finish the communication before the battery runs down.

Fifth Embodiment

A mobile terminal according to a fifth embodiment is characterized by prohibiting or permitting execution of specific processing, as the "predetermined processing".

Fifth Embodiment

Configuration

The functional configuration of the mobile terminal according to the fifth embodiment is the same as the functional configuration of the mobile terminal according to the first embodiment shown in FIG. 2.

Further, the configuration of processing executed by the mobile terminal according to the fifth embodiment is the same as the configuration of the processing shown in the first embodiment.

Fifth Embodiment

Processing Flow

Figure 27:
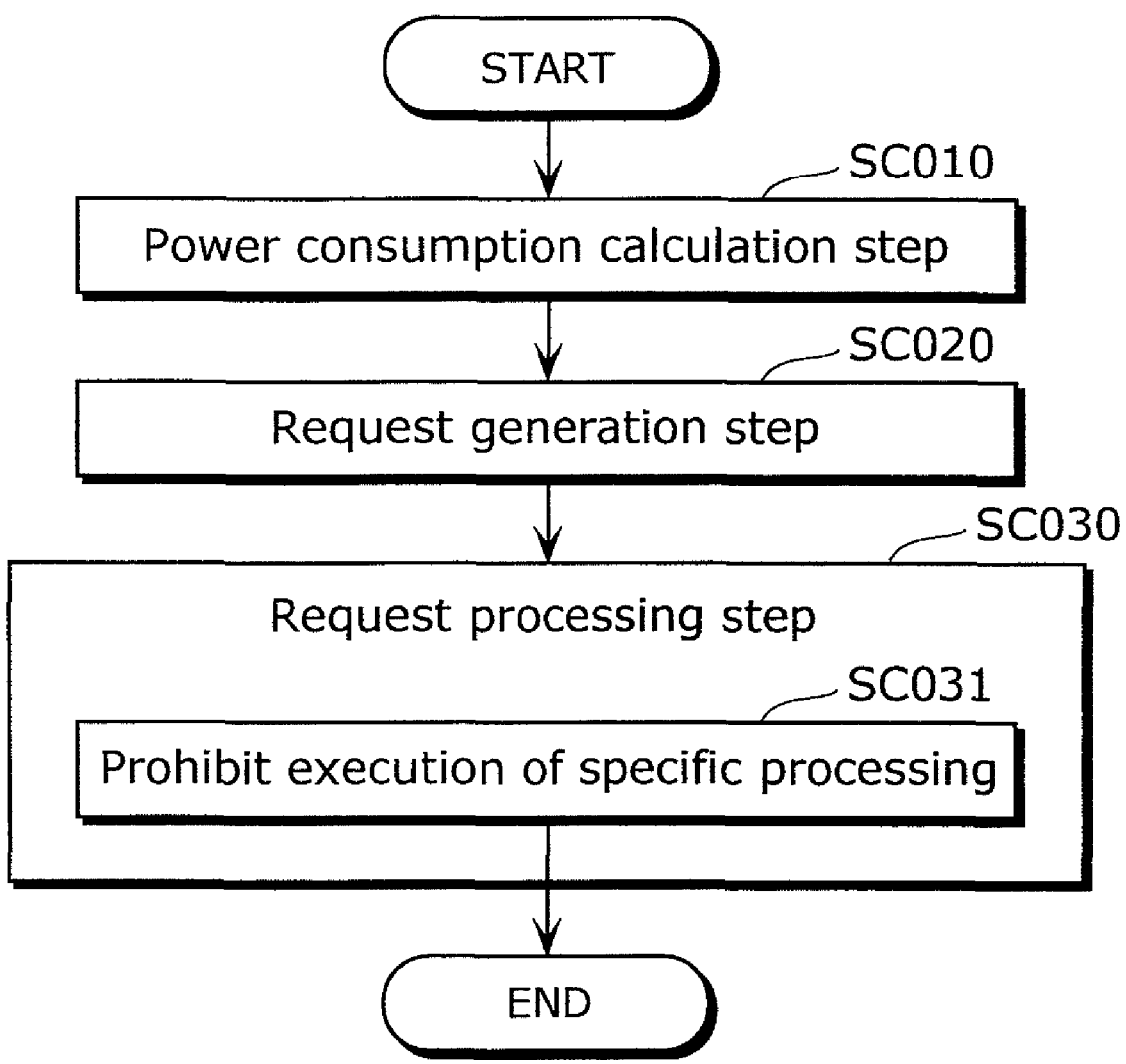
FIG. 27 is a flow chart of processing executed by a mobile terminal according to a fifth embodiment of the present invention.

FIG. 27 is a flow chart showing an example of a flow of processing executed by the mobile terminal according to the fifth embodiment.

The power consumption calculating unit K101 first calculates the "power consumption information" (the power consumption information 112 or the power consumption information 122) of the "processing" (the processing A 110 or the processing B 120) (SC010). Next, the request generating unit K102 generates the "request" according to the "remaining amount of power" (the remaining amount of power 230) (SC020). The processing of SC010 and SC020 are the same as the processing of S1010 and S1020, respectively, which are shown in FIG. 9 of the first embodiment.

Next, the request processing unit K103 executes the "predetermined processing" (the predetermined processing 200) in response to the "request" (SC030). As the "predetermined processing", the request processing unit K103 prohibits, in response to the "request", execution of specific processing (SC031). A method for prohibiting execution of specific processing includes, for example: not reacting to the user pressing a specific button of the mobile terminal; and forcibly disabling a function which has been set, such as vibration. More specifically, the method includes: prohibiting a specific interrupt; and forcibly making specific processing be on a wait status. It is to be noted that when specific processing to be prohibited is in execution and the like at the time of the "request" being generated, the specific processing may be prohibited after the execution is terminated, or after a certain period of time after displaying a warning.

It is to be noted that the request processing unit K103 may permit execution of specific processing in response to the "request". Permitting execution of specific processing includes, for example, permitting execution of the function prohibited in the above step, and permitting execution of a power-saving mode function having restricted functions when the remaining amount of power falls below a threshold value. To be more specific, the permission includes: permission of a specific interrupt; and release of a specific processing which has been forcibly made to be on a wait status.

Fifth Embodiment

Advantageous Effect

According to the mobile terminal of the fifth embodiment, prohibition or permission of execution of specific processing is possible, as the "predetermined processing". As a result, prohibiting and suppressing use of a dispensable function makes it possible to prevent such a situation as where a call cannot be made due to battery exhaustion.

Sixth Embodiment

A mobile terminal according to a sixth embodiment is characterized by outputting charging facility information, which is information on a position at which the mobile phone can be charged, as the "predetermined processing".

Sixth Embodiment

Configuration

Figure 28:
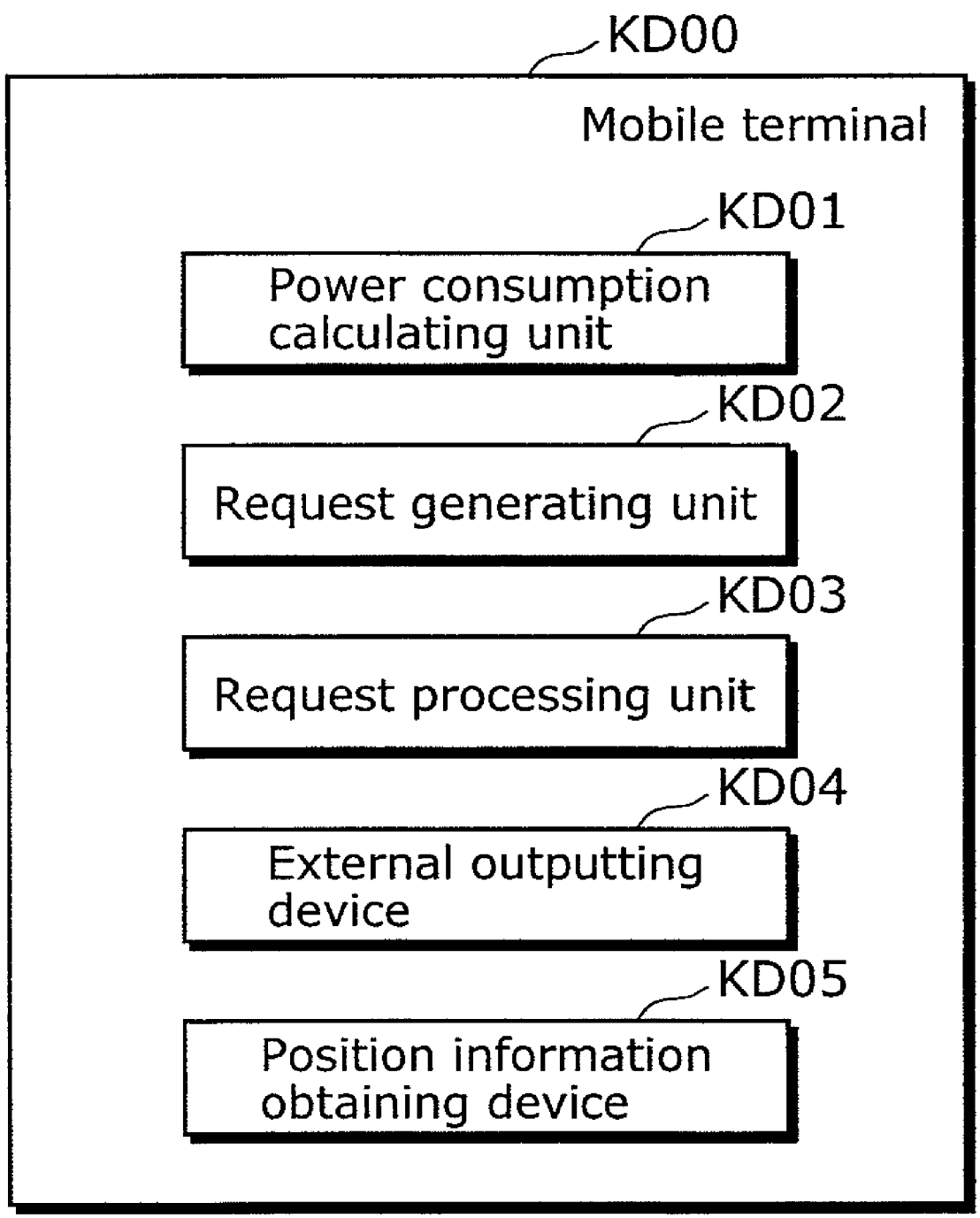
FIG. 28 is a diagram showing a functional configuration of a mobile terminal according to a sixth embodiment of the present invention.

FIG. 28 is a diagram showing a functional configuration of the mobile terminal according to the present embodiment.

A mobile terminal KD00 includes a power consumption calculating unit KD01, a request generating unit KD02, and a request processing unit KD03. The mobile terminal KD00 may further include an external outputting device KD04 and a position information obtaining device KD05.

The mobile terminal KD00 is a mobile device which is battery-operated and is portable. More specifically, examples of the mobile terminal KD00 include mobile phones, PHS, PDA, mobile game machines, and laptop computers. The power consumption calculating unit KD01 and the request generating unit KD02 have the same configuration as that of the power consumption calculating unit K101 and the request generating unit K102 of the first embodiment, respectively. The request processing unit KD03 is characterized by outputting charging facility information. The mobile terminal KD00 may further include an external outputting device KD04. The external outputting device KD04 is the same as the external outputting device K904 of the second embodiment. In addition, the mobile terminal KD00 may further include a position information obtaining device KD05. The position information obtaining device KD05 is a device, such as a Global Positioning System (GPS) receiver, for obtaining position information.

The configuration of processing executed by the mobile terminal according to the sixth embodiment is the same as the configuration of the processing shown in the first embodiment.

Sixth Embodiment

Processing Flow

Figure 29:
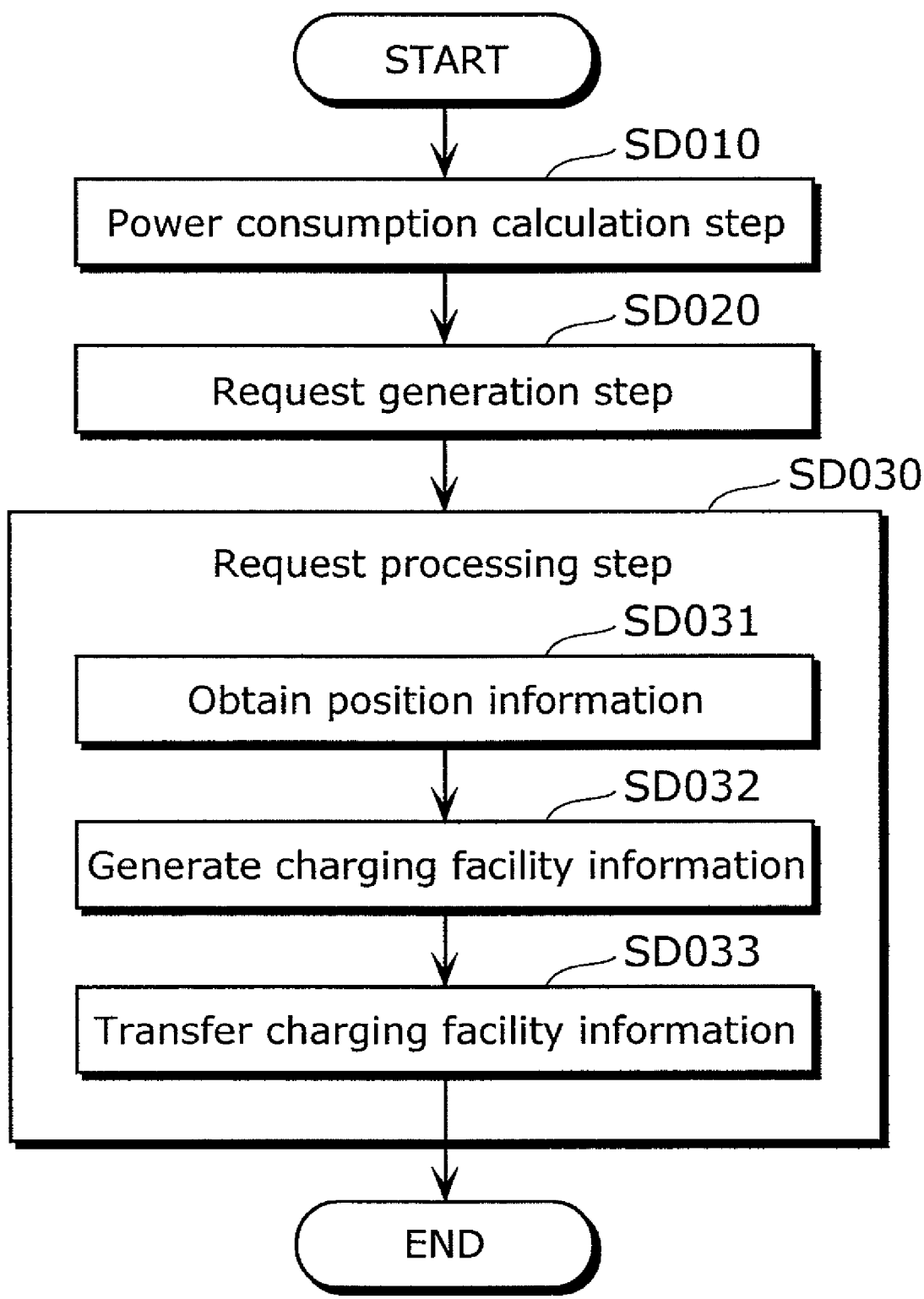
FIG. 29 is a flow chart of processing executed by the mobile terminal according to the sixth embodiment of the present invention.

FIG. 29 is a flow chart showing an example of a flow of processing executed by the mobile terminal according to the sixth embodiment.

The power consumption calculating unit KD01 first calculates the "power consumption information" (the power consumption information 112 or the power consumption information 122) of the "processing" (the processing A 110 or the processing B 120) (SD010). Next, the request generating unit KD02 generates the "request" according to the "remaining amount of power" (the remaining amount of power 230) (SD020). The processing of SD010 and SD020 are the same as the processing of S1010 and S1020, respectively, which are shown in FIG. 9 of the first embodiment.

Next, the request processing unit KD03 executes the "predetermined processing" (the predetermined processing 200) in response to the "request" (SD030). As the "predetermined processing", the request processing unit KD03 first obtains position information concerning the current position of the user, in response to the "request" (SD031). The position information can be obtained using the position information obtaining device KD05 which is a GPS receiver and the like.

Next, the request processing unit KD03 generates charging facility information (SD032). The charging facility information generated is for example information indicating map information of a charging facility located near the user's current position, and information indicating a shop (a convenient store, or the like) at which an appliance for charging the mobile terminal (battery, and the like) can be purchased. It is to be noted that the charging facility information may be a character string, image data, image data for animation, audio data, or the like.

Next, the request processing unit KD03 transfers the charging facility information to the external outputting device KD04 (SD033). As a specific example, the request processing unit KD03 may transfer the charging facility information to the external outputting device KD04 by writing the charging facility information to a specific external register, a specific memory region or the like. The external outputting device KD04 may be a display device or an audio outputting device of the mobile terminal, for example. Further, the external outputting device KD04 may transmit position information concerning a shop and the like to a car navigation system and the like. Furthermore, the external outputting device KD04 may transmit position information of the mobile terminal to the shop and the like indicated in the transferred charging facility information. As a result, the shop and the like become aware of roughly how many mobile terminals exist around the shop that need to be charged.

Sixth Embodiment

Advantageous Effect

According to the mobile terminal of the sixth embodiment, outputting the charging facility information is possible as the "predetermined processing". As a result, it is possible to notify the user of a position of a nearby charging facility and the like, and thus the user can take an appropriate action such as charge the mobile terminal at the nearby charging facility, to prevent battery exhaustion and so on.

Seventh Embodiment

A mobile terminal according to a seventh embodiment is characterized by requesting, as the "predetermined processing", another terminal to continue with execution of the function executed by the mobile terminal up to that point, when the amount of power remaining in the mobile terminal becomes equal to or smaller than a threshold value.

Seventh Embodiment

Configuration

Figure 30:
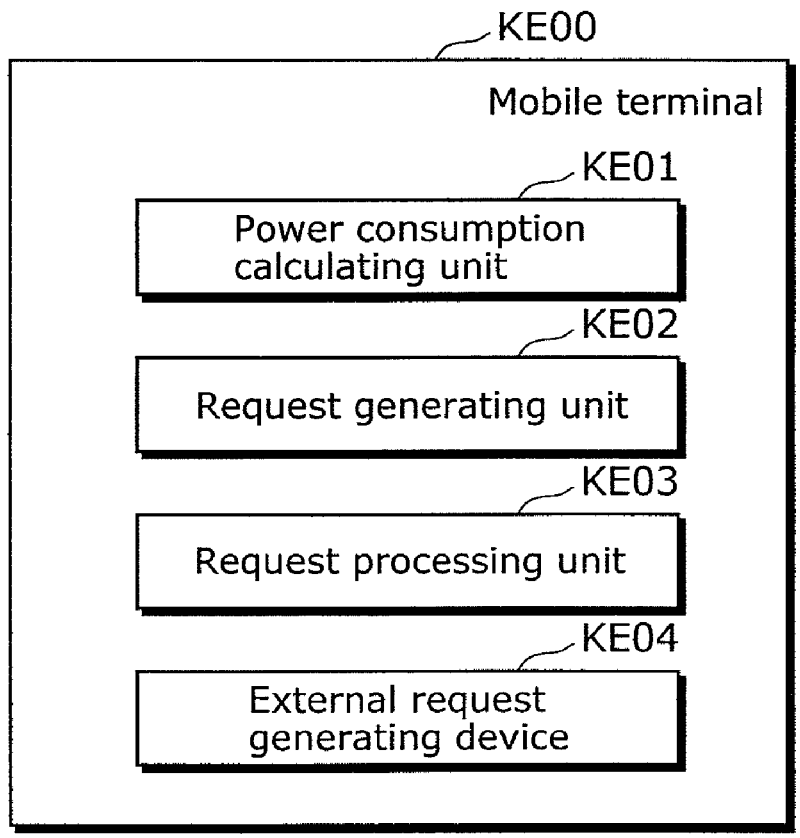
FIG. 30 is a diagram showing a functional configuration of a mobile terminal according to a seventh embodiment of the present invention.

FIG. 30 is a diagram showing a functional configuration of the mobile terminal according to the present embodiment.

The mobile terminal KE00 includes a power consumption calculating unit KE01, a request generating unit KE02, and a request processing unit KE03. The mobile terminal KE00 may further include an external request generating device KE04.

The mobile terminal KE00 is a mobile device which is battery-operated and is portable. More specifically, examples of the mobile terminal KE00 include mobile phones, PHS, PDA, mobile game machines, and laptop computers. Nonetheless, the battery may be provided to a car and the like and may thus be not portable. The power consumption calculating unit KE01 and the request generating unit KE02 have the same configuration as that of the power consumption calculating unit K101 and the request generating unit K102 of the first embodiment, respectively. The request processing unit KE03 is characterized by requesting another terminal to continue with the execution of the function executed by the mobile terminal up to that point, when the amount of power remaining in the mobile terminal becomes equal to or smaller than a threshold value. The mobile terminal KE00 may further include an external request generating device KE04. The external request generating device KE04 is a device that generates radio signals of wireless Local Area Network (LAN) or of Bluetooth, and radio waves and the like of the mobile terminal.

Figure 31:
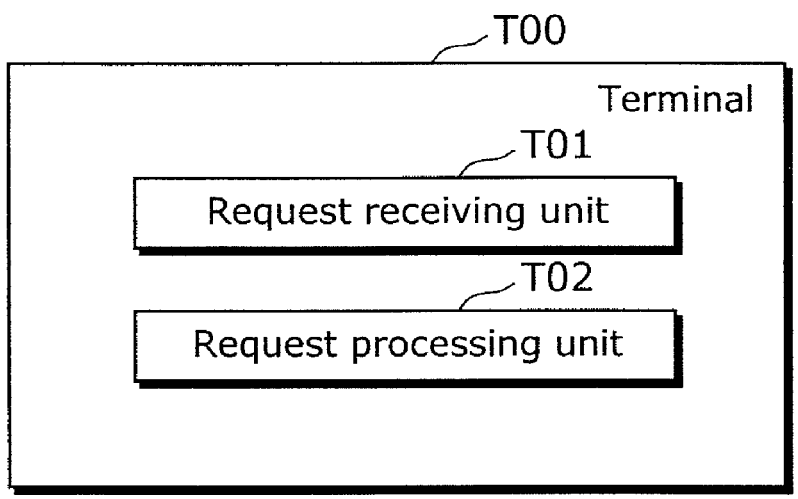
FIG. 31 is a diagram showing a functional configuration of a terminal according to the seventh embodiment of the present invention.

FIG. 31 is a diagram showing a functional configuration of a terminal according to the present embodiment.

A terminal T00 is a network home appliance (Digital Video Recorder (DVR), a Blu-ray™ Disc Recorder (BD-R), a Hard Disk Drive (HDD) recorder, a Personal Computer, for example), a car navigation system, and the like. A request receiving unit T00 of the terminal T00 can receive the radio signals generated by the external request generating device KE04. For example, the request receiving unit T00 can receive radio signals of wireless LAN or of Bluetooth, and radio waves of the mobile terminal. The request processing unit T02 is a processing unit capable of continuing with the execution of the processing identical to the processing executed by the mobile terminal KE00. For example, the processing executed by the request processing unit T02 includes a video display function, the Internet function, and the call function.

The configuration of processing executed by the mobile terminal according to the seventh embodiment is the same as the configuration of the processing shown in the first embodiment.

Seventh Embodiment

Processing Flow

Figure 32:
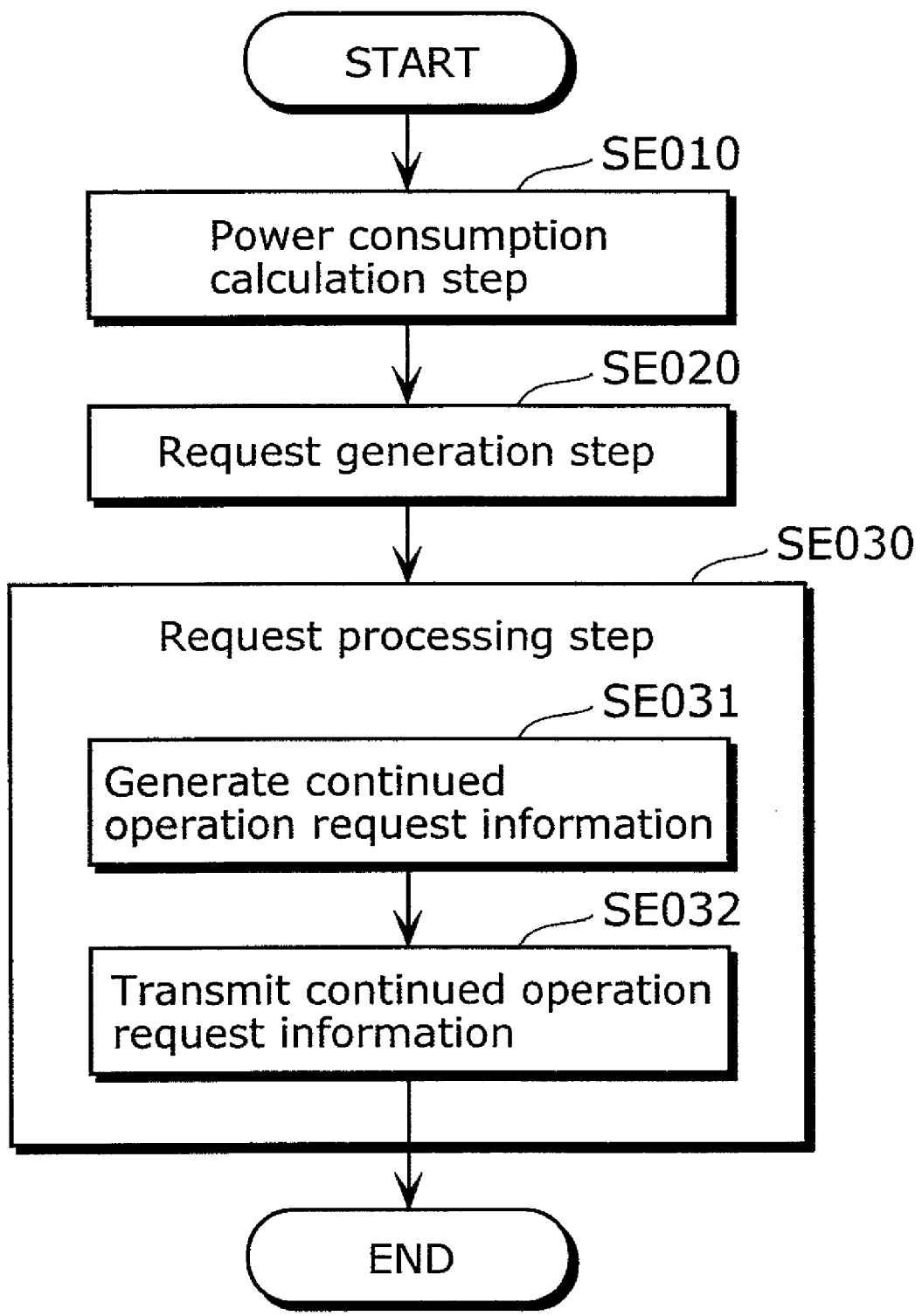
FIG. 32 is a flow chart of processing executed by the mobile terminal according to the seventh embodiment of the present invention.

FIG. 32 is a flow chart showing an example of a flow of processing executed by the mobile terminal according to the seventh embodiment.

The power consumption calculating unit KE01 first calculates the "power consumption information" (the power consumption information 112 or the power consumption information 122) of the "processing" (the processing A 110 or the processing B 120) (SE010). Next, the request generating unit KE02 generates the "request" according to the "remaining amount of power" (the remaining amount of power 230) (SE020). The processing of SE010 and SE020 are the same as the processing of S1010 and S1020, respectively, which are shown in FIG. 9 of the first embodiment.

Next, the request processing unit KE03 executes the "predetermined processing" (the predetermined processing 200) in response to the "request" (SE030). As the "predetermined processing", the request processing unit KE03 first generates, in response to the "request", continued execution request information indicating which function is to be executed continuously by another terminal (SE031). The continued execution request information includes a request for TV viewing, TV recording, the Internet function, the mail function, the call function, the GPS function, the camera function, and the like.

Next, the request processing unit KE03 transfers the continued execution request information to the external request generating device KE04 (SE032). As a specific example, the request processing unit KE03 generates a request via wireless LAN or Bluetooth, or using a radio wave generating device of the mobile terminal. In the case of using the wireless LAN, Transmission Control Protocol/Internet Protocol (TCP/IP) can be used, for example, as a communication protocol.

Seventh Embodiment

Advantageous Effect

According to the mobile terminal of the seventh embodiment, when the amount of power remaining in the mobile terminal becomes equal to or smaller than a threshold value, it is possible, as the "predetermined processing": to request another terminal to continue with the execution of a function executed by the mobile terminal up to that point; and to continue with the execution of the function of the mobile terminal using the other terminal. For example, when there is only a small amount of power remaining in the battery of a mobile terminal, it is possible to continue with recording of a program being recorded by the mobile terminal, and when the amount of power remaining in the battery of the mobile terminal becomes smaller during a call, it is possible to continue the call by temporarily using another terminal. Further, it is possible, when playing a game with a mobile terminal, to save data of the game in another mobile terminal before the battery runs down. As a result, when there is only a small amount of power left, the user can continuously execute the game function using the other terminal.

Although only some exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

INDUSTRIAL APPLICABILITY

The present invention is applicable to mobile terminals and the like that are portable, and is especially applicable to mobile phones, PHS, PDA, mobile game machines, laptop computers, and the like.

What is claimed is:

1. An information processing device configured to measure power consumption of a specific function of said information processing device, and execute predetermined processing when a remaining amount of power of said information processing device becomes equal to or smaller than an amount of power consumption necessary for executing the specific function for a specific period of time with the measured power consumption, said information processing device comprising:
 a power consumption calculator configured to calculate, for each processing executed by said information processing device, power consumption information concerning an amount of power consumed by executing each processing;
 a request generator configured to compare the amount of power indicated by the power consumption information and a remaining amount of power of said information processing device, and to generate a request to execute the predetermined processing according to a result of the comparison; and
 a request processor configured to execute the predetermined processing in response to the request generated by said request generator,
 wherein the power consumption information includes: an ensured minimum execution time period, which is a minimum period of time for which a user wishes to execute the processing, and power consumption, which is an amount of power consumed when the processing is executed for a unit of time, and
 said power consumption calculator is further configured to manage the power consumption information through historical management based upon previously calculated power consumption information.

2. The information processing device according to claim 1, wherein said power consumption calculator is configured to calculate, as the power consumption, an average of the power consumption managed through historical management.

3. The information processing device according to claim 1, wherein said power consumption calculator is configured to update the power consumption when the power consumption managed through historical management and current power consumption satisfy a predetermined condition.

4. The information processing device according to claim 1, wherein the power consumption information further includes a processing operation mode in which processing is executed, and
said power consumption calculator is configured to calculate power consumption based on the power consumption managed through historical management and on the processing operation mode.

5. The information processing device according to claim 1, wherein said power consumption calculator is configured to calculate power consumption by dividing, by an execution time period, an amount of power consumption for execution, the execution time period being a period of time for which processing is executed, and the amount of power consumption for execution being an amount of power consumed when the processing is executed for the execution time period.

6. The information processing device according to claim 5, wherein the amount of power consumption for execution is calculated based on: a remaining amount of power of said information processing device at a start of the processing;
and a remaining amount of power of said information processing device at termination of the processing, and
the execution time period is calculated based on a time at the start of the processing and a time at the termination of the processing.

7. The information processing device according to claim 1, wherein said power consumption calculator is configured to calculate power consumption based on: an amount of power consumption for execution, which is an amount of power consumed when the processing is executed for an execution time period, the execution time period, which is a period of time for which processing is executed and an external factor coefficient, which is a value determined based on an external factor affecting the power consumption.

8. The information processing device according to claim 7, wherein said power consumption calculator is configured to calculate power consumption by multiplying, by the external factor coefficient, a value calculated by dividing the amount of power consumption for execution by the execution time period.

9. The information processing device according to claim 7, wherein the external factor coefficient is determined based on an operation mode of a processor of said information processing device.

10. The information processing device according to claim 1, wherein the ensured minimum execution time period is a value set in advance.

11. The information processing device according to claim 1, wherein said power consumption calculator is configured to update the ensured minimum execution time period at a predetermined timing.

12. The information processing device according to claim 1,
wherein said power consumption calculator is configured to calculate the power consumption information when periodically occurs event is processed.

13. The information processing device according to claim 1,
wherein the power consumption information further includes an ensured amount of power, which is, an amount of power necessary for ensuring execution of processing for the ensured minimum execution time period, and
said request generator is configured to generate the request to execute the predetermined processing when a total ensured amount of power and the remaining amount of power satisfy a predetermined condition, the total ensured amount of power being a sum of ensured amounts of power of all processing.

14. The information processing device according to claim 1, the historical management being based upon a previously calculated history of power consumption, an ensured minimum execution time period and an operation mode.

15. A mobile terminal configured to measure power consumption of a specific function of an information processing device, and execute predetermined processing when a remaining amount of power of the information processing device becomes equal to or smaller than an amount of power consumption necessary for executing, with the measured power consumption, the specific function for a specific period of time, said mobile terminal comprising:
   a power consumption calculator configured to calculate, for each processing executed by said information processing device, power consumption information concerning an amount of power consumed by executing each processing;
   a request generator configured to compare the amount of power indicated by the power consumption information and a remaining amount of power of said information processing device, and to generate a request to execute the predetermined processing according to a result of the comparison; and
   a request processor configured to execute the predetermined processing in response to the request generated by said request generator,
   wherein the power consumption information includes: an ensured minimum execution time period, which is a minimum period of time for which a user wishes to execute the processing, and power consumption, which is an amount of power consumed when the processing is executed for a unit of time, and
   said power consumption calculator is further configured to manage the power consumption information through historical management based upon previously calculated power consumption information.

16. The mobile terminal according to claim 15,
wherein the predetermined processing executed by the information processing device comprises processing to display a message on said mobile terminal.

17. The mobile terminal according to claim 15,
wherein the predetermined processing executed by the information processing device comprises processing to switch said mobile terminal to a power-saving mode.

18. The mobile terminal according to claim 15,
wherein the predetermined processing executed by the information processing device comprises processing to notify another terminal of predetermined information.

19. The mobile terminal according to claim 15,
wherein the predetermined processing executed by the information processing device comprises processing to either prohibit or permit execution of a specific function of said mobile terminal.

20. The mobile terminal according to claim 15,
wherein the predetermined processing executed by the information processing device comprises processing to display, on said mobile terminal a location of a charging facility.

21. The mobile terminal according to claim 15,
wherein the predetermined processing executed by the information processing device comprises processing to switch between operation modes of a specific function of said mobile terminal.

22. The mobile terminal according to claim 15,
wherein the predetermined processing executed by the information processing device comprises processing to power off said mobile terminal.

23. The mobile terminal according to claim 15,
wherein the predetermined processing executed by the information processing device comprises processing to cause another mobile terminal to continue with execution of an operation which has been executed by said mobile terminal.

24. The mobile terminal according to claim 15, the historical management being based upon a previously calculated history of power consumption, an ensured minimum execution time period and an operation mode.

* * * * *